(12) United States Patent
Kettlewell

(10) Patent No.: US 12,554,869 B2
(45) Date of Patent: Feb. 17, 2026

(54) DEVICE AND A METHOD FOR PERFORMING A CRYPTOGRAPHIC ALGORITHM

(71) Applicant: nCipher Security Limited, Cambridge (GB)

(72) Inventor: Richard John Kettlewell, Cambridge (GB)

(73) Assignee: NCIPHER SECURITY LIMITED, Cambridge (GB)

( * ) Notice: Subject to any disclaimer, the term of this patent is extended or adjusted under 35 U.S.C. 154(b) by 180 days.

(21) Appl. No.: 18/040,968

(22) PCT Filed: Aug. 5, 2021

(86) PCT No.: PCT/GB2021/052035
§ 371 (c)(1),
(2) Date: Feb. 7, 2023

(87) PCT Pub. No.: WO2022/029444
PCT Pub. Date: Feb. 10, 2022

(65) Prior Publication Data
US 2023/0274008 A1 Aug. 31, 2023

(30) Foreign Application Priority Data
Aug. 7, 2020 (EP) .................................... 20190045

(51) Int. Cl.
*G06F 21/60* (2013.01)
*G06F 21/62* (2013.01)
(52) U.S. Cl.
CPC .......... *G06F 21/604* (2013.01); *G06F 21/602* (2013.01); *G06F 21/6209* (2013.01)
(58) Field of Classification Search
CPC .. G06F 21/604; G06F 21/602; G06F 21/6209; G06F 21/72; G06F 2221/2113;
(Continued)

(56) References Cited

U.S. PATENT DOCUMENTS

2006/0136332 A1  6/2006  Ziegler
2018/0367311 A1* 12/2018 Stahlberg ............... H04L 9/3234
2021/0406404 A1* 12/2021 Moran ................... H04L 9/3236

FOREIGN PATENT DOCUMENTS

EP    2957063 A1    12/2015
WO   00/42730 A1    7/2000

OTHER PUBLICATIONS

International Search Report and Written Opinion for PCT/GB2021/052035 (Oct. 29, 2021).
(Continued)

*Primary Examiner* — Izunna Okeke
(74) *Attorney, Agent, or Firm* — Merchant & Gould P.C.

(57) ABSTRACT

A computer implemented method comprising: obtaining first data, comprising a representation of computer program code that embodies a cryptographic algorithm; obtaining second data; receiving a request for a first mechanism to be performed, the request comprising information identifying the first mechanism, and information identifying the first data as corresponding to a program and the second data as corresponding to an input; performing the first mechanism, wherein performing the first mechanism comprises: performing a first determination, the first determination comprising: determining whether a first policy associated with the second data permits the second data to be used with the program represented in the first data, and determining whether a third policy associated with the computer program code permits the computer program code to be used with the second data; and if the first determination is successful, executing the program represented in the first data taking the second data as input.

20 Claims, 11 Drawing Sheets

(58) Field of Classification Search
CPC ........... G06F 2221/2141; H04L 9/0877; H04L 9/088
See application file for complete search history.

(56) References Cited

OTHER PUBLICATIONS

Search Report for European Patent Application No. 20190045.3 (Dec. 18, 2020).
International Preliminary Report on Patentability received for PCT Serial No. PCT/GB2021/052035 on Feb. 16, 2023, 10 pgs.

* cited by examiner

DEVICE AND A METHOD FOR PERFORMING A CRYPTOGRAPHIC ALGORITHM

This application is a National Stage Application of PCT/GB2021/052035, filed Aug. 5, 2021, which claims benefit of priority to European Patent Application No. 20190045.3, filed Aug. 7, 2020, and which applications are incorporated herein by reference. To the extent appropriate, a claim of priority is made to each of the above disclosed applications.

FIELD

The present invention relates to a device and a method for performing a cryptographic algorithm. For example, the device may be a hardware security module device.

BACKGROUND

Various devices may be used to perform cryptographic algorithms. For example, a hardware security module (HSM) is a device that securely stores and manages cryptographic keys, and performs a set of cryptographic algorithms. A HSM may comprise both physical and non-physical properties that provide security. Non-physical security properties can include the use of encryption, i.e. the inclusion in the device of software or a physical component to perform encryption of the stored data. Physical security properties can include tamper switches triggered by physical access, and a tamper proof membrane surrounding the physical boundary of the device for example.

The set of algorithms supported by the HSM may be defined by a trusted party. For example, computer program code embodying the algorithms can be embedded in the HSM when manufactured by the trusted party, or can be provided by the trusted party as a whole or in part after manufacture, in the form of a download, an update, or plug-in.

To add a new cryptographic algorithm to the set of algorithms supported by the HSM device, the trusted party may define an interface to the new algorithm and translate the specification of the algorithm into executable code. An upgrade procedure is then carried out at the HSM by the trusted party, such that the new code is stored on the HSM. This upgrade procedure interrupts service from the HSM.

BRIEF DESCRIPTION OF THE FIGURES

Devices and methods in accordance with non-limiting embodiments will now be described with reference to the accompanying figures in which.

DETAILED DESCRIPTION

Figure 1:
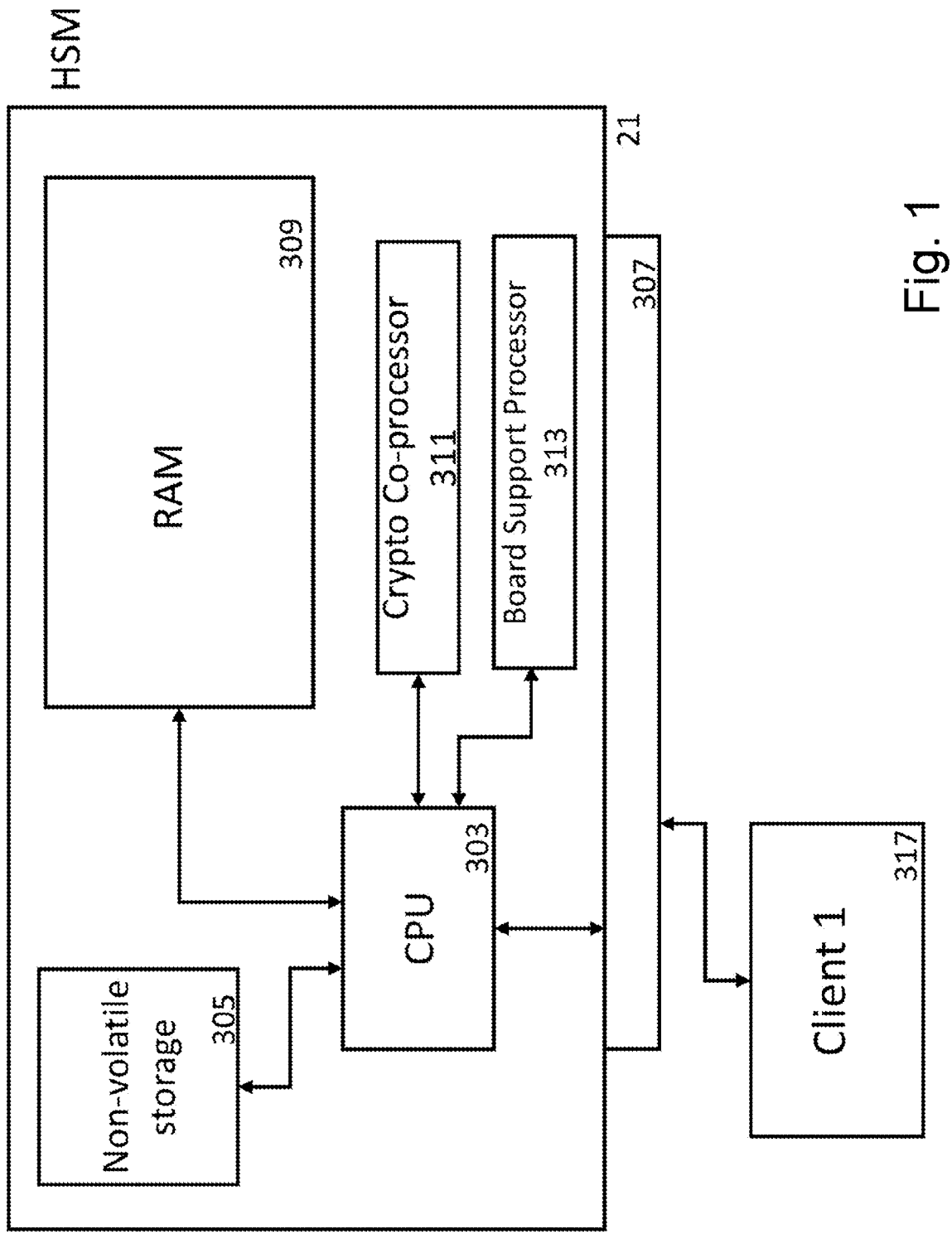
FIG. 1 is a schematic illustration of a hardware security module device in accordance with an embodiment.

According to one aspect, there is provided a computer implemented method comprising: obtaining first data, comprising a representation of computer program code that embodies a cryptographic algorithm; obtaining second data; receiving a request for a first mechanism to be performed, the request comprising information identifying the first mechanism, and information identifying the first data as corresponding to a program and the second data as corresponding to an input; performing the first mechanism, wherein performing the first mechanism comprises: performing a first determination, the first determination comprising determining whether a first policy associated with the second data permits the second data to be used with the program represented in the first data; and if the first determination is successful, executing the program represented in the first data taking the second data as input.

Obtaining the first data may comprise receiving the first data at a second device from a first device, wherein the first mechanism is performed at the second device. The first device may be a client device. The second device may be a HSM device. The request is received at the second device from the same first device or a different third device.

The above described method improves the security of a system by allowing algorithms to be provided to and executed within a device, under constraints set by a policy associated with an input to the algorithm. The policy may be cryptographically bound to the input, or bound by the mechanism for providing the input for example. The method enables new algorithms to be performed on a device more efficiently than implementing them directly in updated firmware. The method provides improved flexibility in the functionality of the device, allowing new algorithms or new combinations of existing algorithms to be performed in a secure fashion. The second data may be a cryptographic key for example. A policy attached to the key can constrain the code that operates on the key.

The step of executing the program may further comprise a step of outputting data based on the result of the program. The result of the program may be a cryptographic key. The output data may be an identifier or reference to the cryptographic key.

In an embodiment, the first determination further comprises determining whether the first policy permits the second data to be used in the first mechanism. The first policy may be a first access control list comprising a list of permissions relating to use of the second data. A second data packet may comprise the second data and the first policy. In this specification, a data packet may but need not be one or more packets of a data communication system.

In an embodiment, a policy attached to code can constrain the keys it operates upon. In an embodiment, the first determination further comprises determining whether a third policy associated with the computer program code permits the computer program code to be used with the second data. The first determination may further comprise determining whether the third policy permits the computer program code to be used with the first mechanism. The third policy may be a third access control list comprising a list of permissions relating to use of the program. The first data may be a first data packet, comprising the representation of the computer program code and the third policy.

In an embodiment, the method further comprises: obtaining third data, comprising a representation of output policy information; wherein the request further comprises information identifying the third data as corresponding to a second policy; wherein performing the first mechanism further comprises associating the second policy with output data from the program.

In an embodiment, the policy attached to code can constrain the template to be bound to the output of the code. In an embodiment, the policy attached to the template can constrain the code used to generate the key to be bound to the template. In an embodiment, the first determination further comprises determining whether the first policy permits the second data to be used with the output policy in the third data. The first determination may further comprise determining whether a fourth policy associated with the output policy permits the output policy to be used with the second data. The first determination may further comprise determining whether the fourth policy permits the output policy to be used with the first mechanism. The first determination may further comprise determining whether the fourth policy permits the output policy to be used with the program represented in the first data. A third data packet may comprise the third data and the fourth policy.

In an embodiment, the method may further comprise: obtaining fourth data; wherein the request further comprises information identifying the fourth data as corresponding to input data; wherein performing the first determination further comprises determining whether a fifth policy associated with the fourth data permits the fourth data to be used with the program represented in the first data.

The request may define the role of the second data and the fourth data. In an embodiment where there are multiple input keys, the input keys may constrain one another. In an embodiment, the first determination further comprises determining whether the fifth policy permits the fourth data to be used with the second data and/or determining whether the first policy permits the second data to be used with the fourth data. A fourth data packet may comprise the fourth data and the fifth policy.

In an embodiment, the computer program code comprises functions from a pre-determined set of functions, which are combined to embody the cryptographic algorithm. Program code embodying the pre-determined set of functions is stored on the device on which the first mechanism is performed. Executing the program comprises retrieving and executing the program code embodying the functions as specified in the computer program code that embodies the cryptographic algorithm. The functions may take as input a value assigned to a register.

In an embodiment, the method further comprises: generating the representation of computer program code that embodies the cryptographic algorithm at a first device; and sending the first data to a second device.

In an embodiment, the method further comprises: generating the request for the first mechanism to be performed at a first device; sending the request for the first mechanism to be performed to a second device; and performing the first mechanism at the second device.

In an embodiment, the method further comprises sending data from the second device to the first device based on the result of the first mechanism. The step of executing the program may further comprise a step of outputting data based on the result of the program. The result of the program may be a cryptographic key. The outputted data may be a reference or identifier for the cryptographic key. The outputted data may be sent from the second device to the first device. In an embodiment, performing the first mechanism further comprises, if the first determination is not successful, outputting an error message. The error message may be sent from the second device to the first device.

According to a second aspect, there is provided a carrier medium comprising computer readable code configured to cause a computer to perform any of the above methods.

According to a third aspect, there is provided a device, comprising: an input configured to receive a request for a first mechanism to be performed, the request comprising information identifying the first mechanism, and information identifying first data as corresponding to a program and second data as corresponding to an input; and a processor configured to: obtain the first data, comprising a representation of computer program code that embodies one or more cryptographic operations, and obtain the second data; perform the first mechanism, wherein performing the first mechanism comprises: performing a first determination, the first determination comprising determining whether a first policy associated with the second data permits the second data to be used with the program represented in the first data; and if the first determination is successful, executing the program represented in the first data taking the second data as input.

The methods are computer-implemented methods. Since some methods in accordance with embodiments can be implemented by software, some embodiments encompass computer code provided on any suitable carrier medium. The carrier medium can comprise any storage medium such as a CD ROM, a magnetic device or a programmable memory device, or any transient medium such as any signal e.g. an electrical, optical or microwave signal. The carrier medium may comprise a non-transitory computer readable storage medium.

FIG. 1 is a schematic illustration of a hardware security module device 21 in accordance with an embodiment. The HSM 11 comprises a processor 303, non-volatile memory 305 and working memory, Random Access Memory (RAM) 309. The RAM 309 is the operating memory of the CPU 303. The non-volatile memory 305 may include any form of non-volatile device memory such as flash, optical disks or magnetic hard drives for example. The non-volatile memory 305 may be physically secure and may be resistant to tamper by a third party, for example by the inclusion of physical security such as a membrane that covers the entire device, that cannot be removed without destroying the underlying physical hardware, thus making it un-usable. The CPU 303 is in wired bi-directional communication with non-volatile storage 305 and also in wired bi-directional communication with the RAM 309.

Computer program code is stored in the non-volatile memory 305. When executed, a program is represented as a software product, or process, in the working memory 309. The processor 303 comprises logic circuitry that responds to and processes instructions in code in the working memory 309. The below description refers to "firmware", which is a program comprising a set of computer instructions. The firmware comprises machine code stored in the non-volatile memory 305 on the HSM 21. Also stored in the non-volatile memory 305 on the HSM 21 are any components necessary to execute the firmware, including runtime system files. When executed, a copy of the firmware machine code is stored in the working memory 309. The "firmware process" is the instance of the firmware that is being executed, comprising the machine code in the RAM 309. Execution of the firmware by the processor 303 causes methods as described herein to be implemented.

The processor 303 runs an operating system, for example a Linux operating system. The operating system comprises system software that manages the hardware and software resources of the HSM device 21, and acts as an intermediary between the firmware and the HSM hardware.

The firmware comprises computer instructions embodying a set of one or more cryptographic algorithms. For example, the firmware comprises computer instructions embodying one or more of the following cryptographic algorithms: cryptographic key generation; key derivation; encryption; decryption; and digital signature algorithms (for example digital signing or validation of a digital signature). The firmware can be embedded in the non-volatile memory 305 of the hardware security module 21 when the hardware security module 21 is manufactured by a trusted party, or can be provided by the trusted party as a whole or in part after manufacture. For instance, the firmware can be introduced by the trusted party as a computer program product, which may be in the form of a download. Alternatively, modifications to existing firmware can be made by the trusted party by an update or plug-in.

The HSM device 21 may be located within a larger system. For example, the HSM 21 may be communicatively coupled to a computer or server device in the larger system through interface 307, which comprises a communication link to the computer or server device. For example, the HSM device 21 can be a PCI express card directly plugged into the computer or server device, or the HSM device 21 can be communicatively connected to the computer or server device by a USB connection. In use, the HSM device 21 receives client requests through interface 307. The term "client" is used throughout the description to refer generally to a user of the HSM device 21.

The HSM 21 may be located in the client system 317. In this case, the client system 317 has a dedicated local HSM 21 device. The HSM 21 is communicatively coupled to a general computer 317 in the client system directly through interface 307, for example the HSM device 21 can be communicatively connected to the computer 317 by a USB connection.

Alternatively, the HSM 21 may be located in a host system which is separate to the client computer 317. The host system may be a service provider system for example. In this case, the client computer 317 communicates with a computer or server device in the host system. The HSM device 21 is coupled to the computer or server device in the host system through interface 307. For example, the HSM device 21 can be a PCI express card directly plugged into the computer or server device in the host system, or the HSM device 21 can be communicatively connected to the computer or server device by a USB connection. The client device 317 is thus communicatively coupled to the HSM device 21 through the computer or server device in the host system. Communication between the client device 317 and the host computer or server device may be performed via an Internet connection for example. Although only a single client machine 317 is shown in the figure, it is to be understood that two or more clients can use the HSM device 21 in this case.

The non-volatile data store 305 may also store data items such as one or more cryptographic keys associated with the client. For example, one or more master keys associated with the client may be stored. The master key or keys define a "security world" associated with the client, in which the HSM device 11 is enrolled. The term "security world" refers to one or more security appliances (for example HSMs), or parts of a security appliance which share at least one private key and are configured to safeguard cryptographic keys and perform a set of cryptographic algorithms. The master keys stored on the non-volatile data storage 15 may comprise a module security world key (KMSW) key. This is a symmetric key used as a root for other application keys.

A number of cryptographic application keys are associated with the client for use with the cryptographic algorithms embodied in the firmware. The application keys may be securely stored outside of the HSM device 21 using the KMSW key. In this case, the application keys may be encrypted using Triple-DES encryption for example.

A HSM can enforce a policy on the use of cryptographic keys. This may be implemented by cryptographically binding a key to an Access Control List (ACL) representing the policy in the form of a list of operations that it may participate in, together with the authorisations required (if any) for those operations. When a user requests some operation using an application key, the ACL of the application key is searched for the operation. Only if it is found, and only if any authorisations required are satisfied, does the operation proceed. The key and ACL are encrypted with the KMSW key. This forms a "key blob". Encrypted key blobs can be stored outside the HSM device 21, either on smart cards or server storage such as hard discs within the host system for example, and loaded onto the HSM device 21 when needed. Alternatively, the application keys may be stored on the HSM device 21, in the non-volatile data storage 305.

The application keys associated with the client are used to perform one or more cryptographic algorithms embodied in the firmware. When a client request is received to perform an algorithm, the relevant application key or keys are retrieved using the module key, and loaded into the RAM space of the firmware process. They may then be used by the hardware security module to perform one or more cryptographic algorithms, including performing various encryption and decryption algorithms, and performing digital signature algorithms.

The HSM device 11 further comprises a board support processor 313. Board support processor 313 is configured to communicate with a plurality of on-board sensors, monitoring the operation of the main CPU and the other hardware components of the hardware security module 21. The sensors may include but are not limited to CPU and/or board temperature sensors, voltage and/or current sensors. The HSM device 11 further comprises a crypto co-processor 311. Various other components may be included which are not shown.

Although a HSM device has been described above, the invention is not limited to such, and the below described methods may be implemented on various devices used for performing cryptographic algorithms. For example, a software emulator running on a general purpose computing device or server may enable the computing device or server to behave like a HSM device. In this case, a computer program running in the computer device or server emulates a HSM device, and the below described methods are implemented on the computer device or server in this environment.

Figure 2:
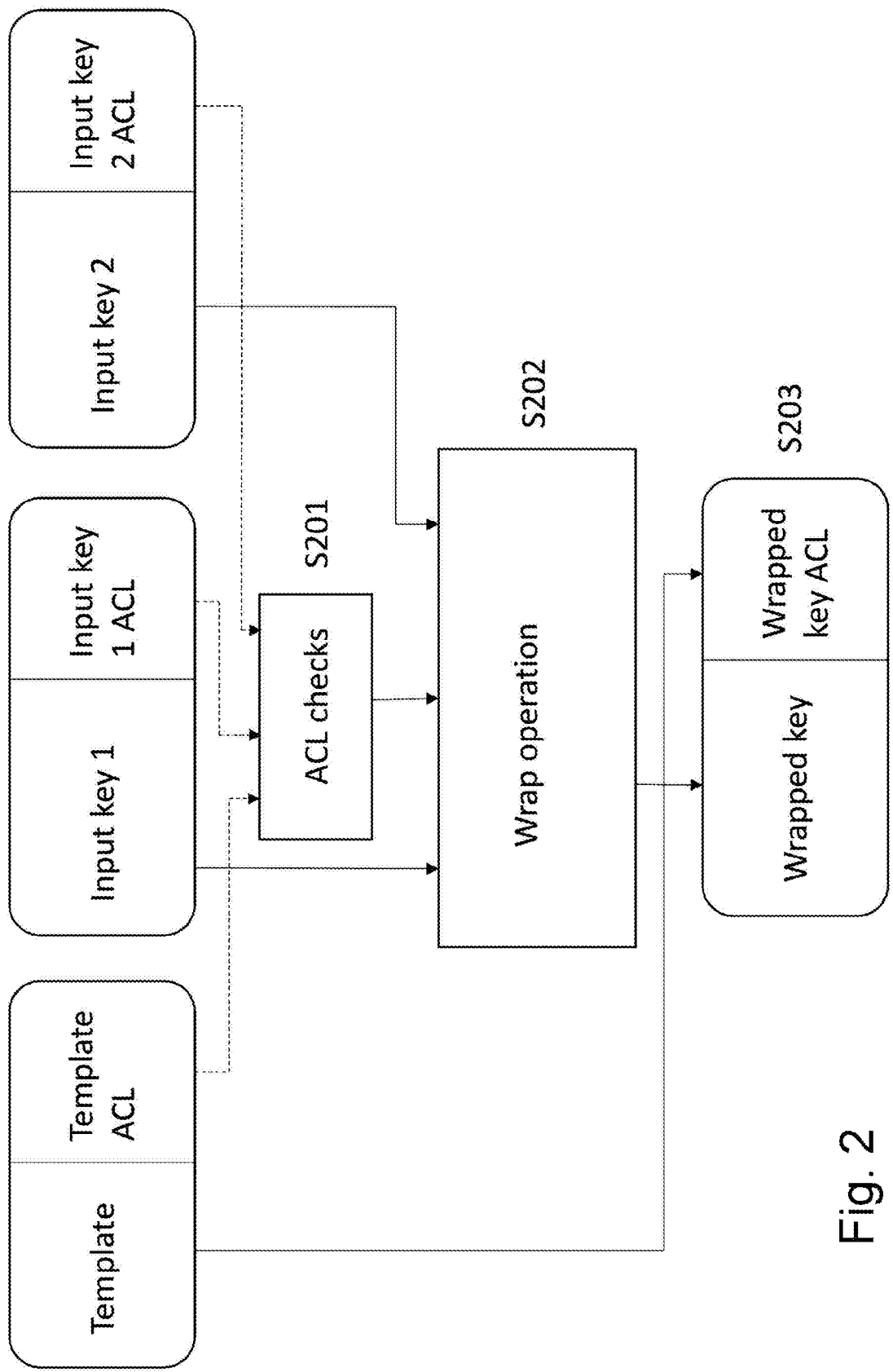
FIG. 2 is a schematic illustration of an example mechanism for a key wrapping algorithm, in which a first input key is encrypted under a second input key.

Various cryptographic algorithms may be performed in the following manner using a key derivation operation, an example of which is illustrated in FIG. 2. The operation is parameterised by a mechanism identifier and a collection of input keys. The mechanism identifier identifies computer program code in the firmware on the HSM device 21 embodying the cryptographic algorithm. The effect of the operation is to create a derived cryptographic key in a manner defined by the mechanism identifier.

FIG. 2 illustrates an example in which the mechanism is for a key wrapping algorithm, in which a first input key is encrypted under a second input key. Initially, a template and the two input keys are loaded into the RAM space of the firmware process in the HSM device 21. They may be imported, or decrypted from a wrapped form, or may be the result of earlier key derivation operations for example.

A client, or an application acting on behalf of a client, requests that the wrap mechanism be performed, in a command, "Cmd DeriveKey", comprising an identifier of the mechanism to be performed (the wrap mechanism in this case) and a reference to the keys to be used, including the template. This command is sent to the HSM device 21. The command "Cmd DeriveKey" takes as argument the mechanism identifier and the list of two or more keys, and produces a result key. For the operation illustrated in FIG. 2, the command comprises a wrap mechanism identifier.

Computer program code in the firmware on the HSM device 21 is identified by the received "Cmd_DeriveKey" command and executed. This code embodies the steps S201 and S203 illustrated in FIG. 2. Computer program code in the firmware on the HSM device 21 embodying the wrap mechanism, comprising a wrap algorithm encrypting a base key, is identified from the mechanism identifier. This code embodies the step S202 illustrated in FIG. 2. The code may be identified from a table on the HSM device 21 associating numeric constants corresponding to the "Cmd_DeriveKey". The memory address of the corresponding code in the RAM 309 is then retrieved. For example, as shown in Appendix 1, the "Cmd DeriveKey" command is identified by the numeric constant 75.

The interpretation of the input keys depends on the mechanism. Each key is assigned to a particular role. This may be defined by the order they are presented in for each mechanism—for example, for the wrap key mechanism, the first "key" in the list is taken to be the template "key", the second is the key to be wrapped (the base key), and the third is the wrapping key (the wrap key). For all "Cmd DeriveKey" commands, it may be defined that the first "key" is always a template "key", regardless of the mechanism specified. As explained later, alternative ways of defining the various key roles may be used.

Although the term "key" is used to refer to the template, in fact the template "key" is not a cryptographic key, rather a data packet comprising ACL information for the output key. The template also has its own ACL, which specifies how the template may be used.

The operation must be permitted by the ACL of each input key and template that participates in it. In S201, the ACL of each input key and template "key" is checked to determine that it permits the key to be used in a Derive Key operation using the wrap mechanism, and in the role to which it has been assigned. Moreover, each input key's ACL may constrain the type and value of the other keys that participate in the operation. For example, the input key to be wrapped (the base key) may constrain the input key it is wrapped under (the wrap key), in order to prevent it being wrapped under an unauthorised key. This is also checked in S201.

If the check of the ACL of each input key and template is successful, the wrap mechanism is performed in S202. The computer program code in the firmware on the HSM device 21 embodying the wrap mechanism, i.e. an encryption algorithm, is executed, taking the input key 1 as the base key and the input key 2 as the wrap key. Finally, the derived key (the wrapped key) is cryptographically bound to an ACL in S203. This ACL is supplied in the special-purpose input "key" called the template. Thus any or all of the input keys participating in the operation may constrain the ACL of the derived key by constraining the template "key".

In the above described manner, various operations resulting in an output key, or derived key, may be performed. However, the operations that may be performed are limited to those for which the computer program code is stored in the firmware on the HSM device 21. In particular, a wrap algorithm may only be performed if computer program code embodying the wrap algorithm is already stored in the firmware on the HSM device 21.

A user may wish to perform an algorithm for which computer program code is not stored in the firmware on the HSM device 21. Allowing the user to provide computer program code embodying the desired algorithm in the form of an update to the firmware would compromise the security of the HSM device 21. In order to avoid this, a trusted party may define an interface for the new algorithm and translate the specification of the new algorithm into executable code. This new code may need to be tested and signed before delivery, in order to ensure security of the HSM device is not compromised. An upgrade procedure is then carried out at the HSM by the trusted party. However, this procedure interrupts service from the HSM. It may also involve the client presenting physical authorisation tokens to reinitialise the HSM before it can return to service for example.

Furthermore, combining multiple operations for deriving keys can present difficulties, even if the code for each separate operation is stored on the HSM device 21. For example, where it is desired that the output key from one operation is taken as an input key for a subsequent operation, generating the policies for the subsequent operation can be problematic. For example, where the subsequent operation uses a wrap mechanism, and where the wrapping key is to be the output of a previous operation, the ACL of the base key (the key to be wrapped) would need to be generated after the previous operation is performed, to constrain the wrapping key. Furthermore, the ACL of the wrapping key would need to permit the subsequent operation. In order to maintain security, it would also be desirable for the ACL of the wrapping key to permit the subsequent operation with the desired mechanism and no other mechanism, in order to avoid intermediate use of the key. Connecting multiple operations in order to generate a cryptographic algorithm in this way quickly becomes complex. Furthermore, a potential security weakness arises at each connection, since intermediate use could be made of the output keys.

Figure 3:
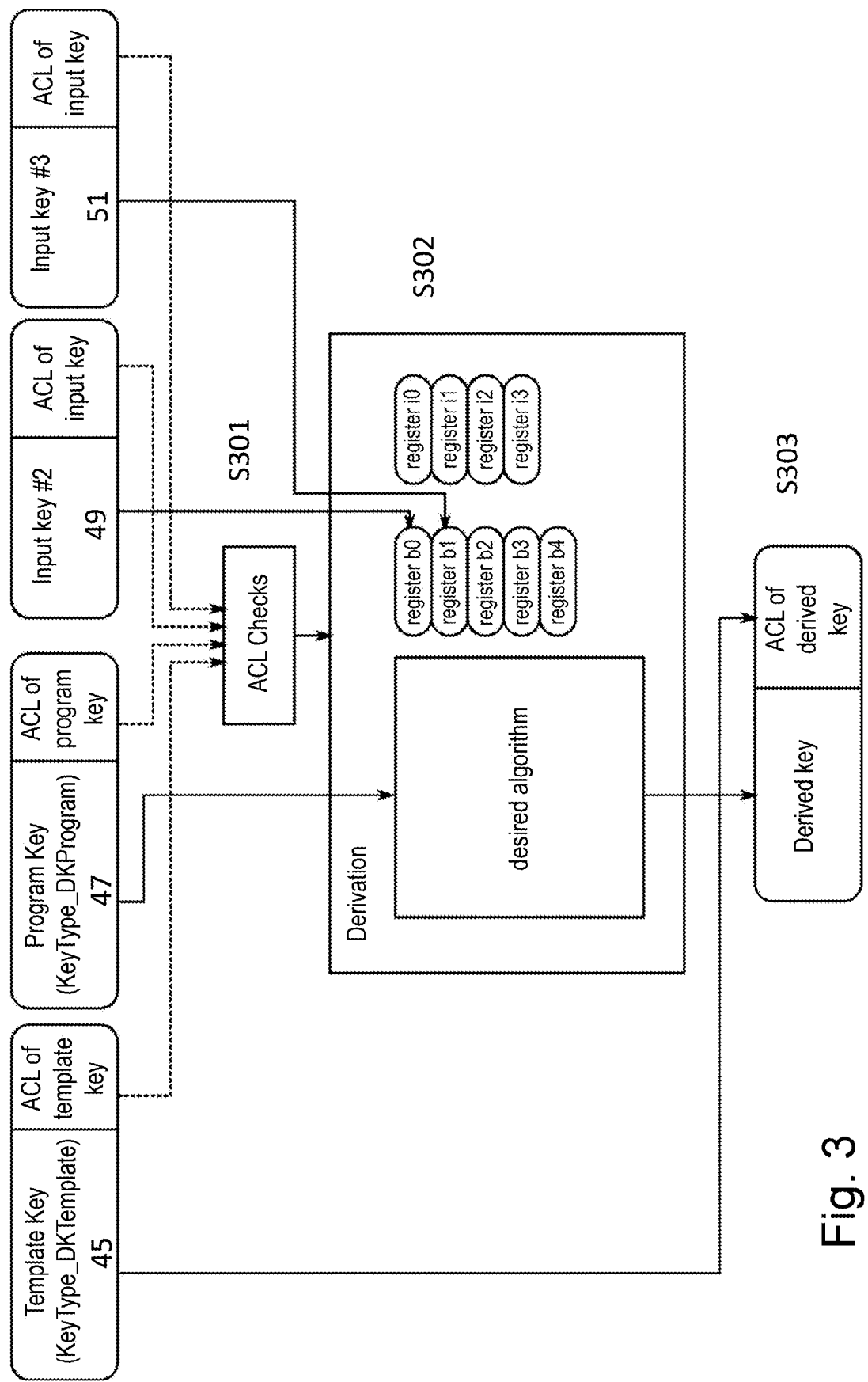
FIG. 3 shows a schematic illustration of a computer implemented method for performing a cryptographic algorithm on a device in accordance with an embodiment.

FIG. 3 shows a schematic illustration of a computer implemented method of performing a cryptographic algorithm on a device in accordance with an embodiment. The device may be a HSM device 21 such as described in relation to FIG. 1 for example. However, as has been explained above, the method may alternatively be performed on one or more of various devices, including a general purpose computer. The method provides a mechanism, the first mechanism, by which an algorithm for which computer program code is not stored on the HSM device 21 may be securely performed on the HSM device 21. The first mechanism is also referred to in this description as the "Derive-Mech Programmed" mechanism.

The computer code embodying the "Cmd_DeriveKey" operation, and embodying the first mechanism, is part of the firmware, for example it is included in the firmware during manufacture of the device or included in a firmware update. However, the computer code embodying the desired algorithm is not included in the firmware on the HSM device 21, but provided by the client.

As has been described above in relation to FIG. 2, computer program code embodying the steps S301 and S303 illustrated in FIG. 3 is stored on the HSM device 21. A first mechanism is also defined. Computer program code is included in the firmware on the HSM device 21 embodying the first mechanism. This code specifies the step S302 illustrated in FIG. 3, which comprises executing a client program taking input data as input. This step is only performed if an initial check in S301 is successful.

In the first mechanism, the first input "key" is again a representation of a template. The second input "key" is a representation of a client program embodying the desired algorithm. Again, although the term "key" is used, in fact the program "key" is not a cryptographic key, rather a representation of a computer program, the client program.

Computer program code embodying the desired algorithm is not required to be stored on the HSM device 21 in advance, but may be provided in an input data packet, the input program "key". Computer program code corresponding to an operation (the Derive Key operation) and a mechanism (the first mechanism) is defined and stored on HSM 21. This operation and mechanism may then be used to implement various algorithms provided by a user in program "keys". The remaining input keys are made available to the client program to operate on. The ultimate result of the client program's execution is a derived key, which is assigned an ACL from the template "key", and can then be used in any way that this ACL permits.

The client program is delivered in an input "key". Its "value" or contents may be constrained by the ACL of any or all of the other keys participating in the operation. In this way security is maintained. Furthermore, since the client program is itself bound to an ACL, it may constrain the value of any of the other participating keys. The representation of the client program code is bound to policy. For example, the ACL is bound to the representation of the client program by the import command, and is stored in a manner that associates it with the client program on the HSM device 21. The client program code is bound directly to policy, i.e. it is not bound to signing keys with the signing keys bound to policy.

By providing the program "key" and requesting the first mechanism to be performed, a client may implement a cryptographic algorithm, without having to carry out a firmware upgrade. By exploiting the ACL system, a client may constrain which keys the algorithm may be applied to and control what authorisation is required to execute it. This check of the relevant ACLs is performed before the client program code in the program "key" is executed. The client program code in the program "key" is only executed once permission has been established. It then runs to completion, producing one or more derived keys.

If multiple client programs are to be run, it is not required that a first client program be terminated for the next client program to be loaded. The only limits on the number of different client algorithms that may be executed at one time are the HSM's general resource limits (e.g. the amount of RAM it contains).

As a first step, the client generates a program embodying the desired algorithm on the client device 317. Optionally, the client program may be written in a general-purpose computer language such as Python. In this case, the runtime system files and interpreter required to execute the client program must be stored on the HSM device 21 and/or packaged and transmitted with the program key. Alternatively, the client program may be written in C for example, and compiled to run on the HSM device 21. A representation of the compiled machine code is then sent to the HSM device 21.

In the example described herein however, the client writes a textual representation of the desired algorithm, using a custom representation. An example of a textual representation of an algorithm using the custom representation is shown below. The various functions shown (Unpack, LoadInt, Branch, Concatenate, Sign, . . . ) will be described later. These functions (Unpack, LoadInt, Branch, Concatenate, Sign, . . . ) map directly to definitions included in the HSM firmware. Machine code embodying the functions is also included in the firmware. Although the HSM firmware comprises computer program code embodying various functions, the combination of the functions in the desired algorithm is not provided in the firmware. Rather, a representation of the algorithm is provided in the program key.

```
.nkeys 4
.keytype Random
Unpack 0 i0 b1 #0 #4
LoadInt i1 #1
LoadInt i3 #1
LoadBytes b1 .
loop:
    GetLength i2 b4
    Branch i2 GE i0 done
    Pack 0 b1 #0 #1 i1
    BinaryOp i1 i1 Add i3
    Concatenate b2 b1 b2
    Concatenate b2 b2 b3
    Sign b2 b2 b0 Rijndael RijndaelmCMAC
    Concatenate b4 b4 b2
    Branch i0 EQ i0 loop
done:
    LoadInt i1 #0
    RegSlice b0 b4 i1 i0
```

Figure 9:
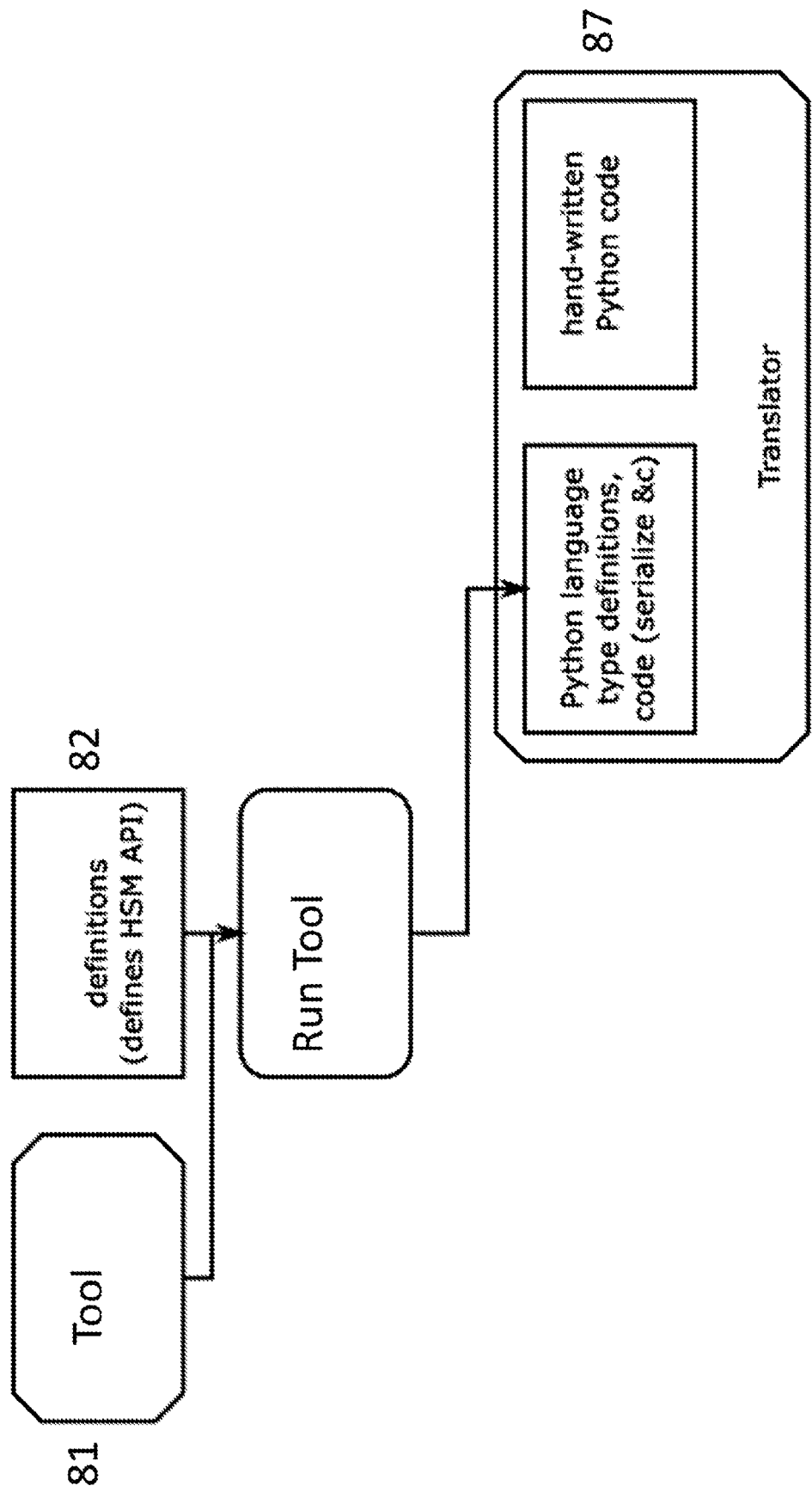
FIG. 9 is a schematic illustration of an example process for generating a translator application which is used as part of a computer implemented method of performing a cryptographic algorithm on a device in accordance with an embodiment.
Figure 10:
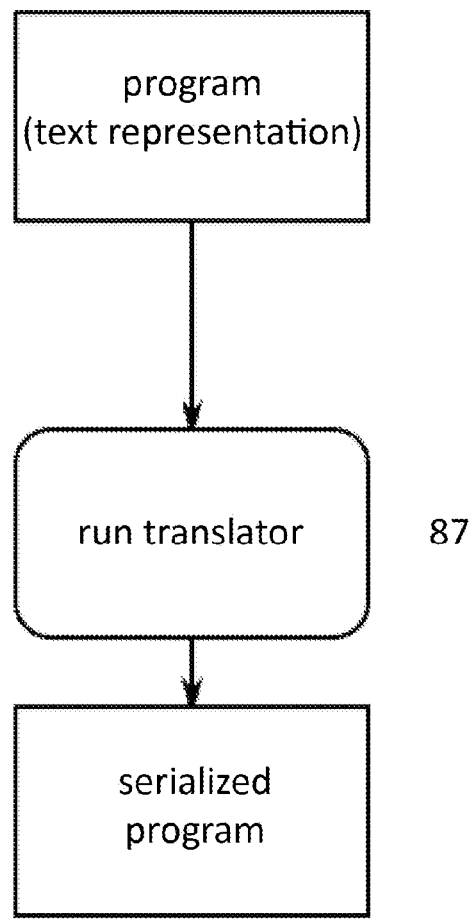
FIG. 10 is a schematic illustration of an example process for generating a serialized representation of a program as part of a computer implemented method of performing a cryptographic algorithm on a device in accordance with an embodiment.

The client writes the textual representation of the desired program using the custom representation on the client device 317. A translator program executes on the client device 317. The textual representation is taken as input to the translator program, which takes the textual representation and converts it to a serialised representation. The translator is an executable program, comprising serialisation code, and various definitions. Thus computer program code in a general-purpose computer language embodying the translator program is stored on the client device. In this example, the computer language is Python. In this example, the translator comprises Python language type definitions, and code for serialisation, de-serialisation and various other functions. Details of the translator, including how it is generated, are described later in relation to FIGS. 9 and 10. The output of the translator is a serialised representation of the client program, i.e. a string of bits.

By constraining the client to writing the desired program using a custom-representation, comprising a fixed number of available functions (corresponding to those for which definitions are stored on the HSM device 21), the chance that human error in writing the code will compromise security is reduced. Furthermore, machine code embodying the functions is included in the firmware of the HSM device 21. However, the functions may be combined in various combinations by the client to generate a desired algorithm. The resulting combination may be run in a single operation.

The serialised representation of the client program is bound to a serialised ACL by an import command to import the program "key". The program "key" is then stored in the HSM 21 internal RAM 309. A key handle is created that refers to the result. The program key is sent from the client device 317 to the HSM device 21.

Figure 4:
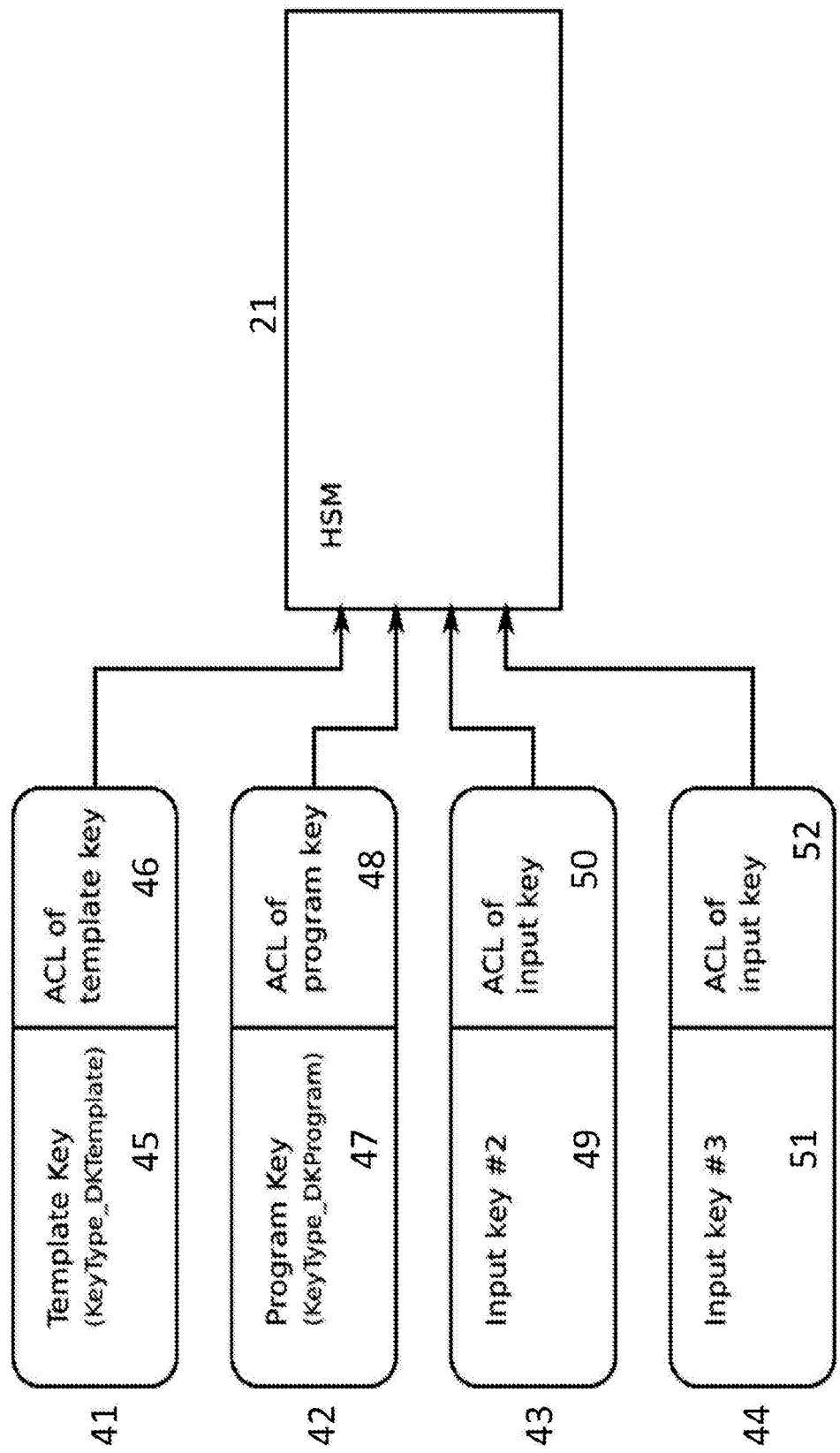
FIG. 4 shows how input keys may be loaded or imported into the HSM internal RAM as part of a computer implemented method of performing a cryptographic algorithm on a device in accordance with an embodiment.

The inputs to the Derive Key operation are the template "key" 45, the program "key" 47 and one or more input keys (together with the bound ACLs). As described above, the program "key" is imported from the client device 317 to the HSM 21. The template "key" and other input key(s) are also loaded or imported into the HSM internal RAM, as shown in FIG. 4. FIG. 4 shows two input keys, however the actual number could be one or more. Generally, template keys and program keys are likely to be imported into the HSM, whereas the input keys may be stored in an encrypted manner on the HSM or in storage accessible to the HSM. For example, they may be encrypted under a long-term symmetric key held in the HSM, encrypted under some other application key, or encrypted under a key reassembled from a set of smartcards. A "Cmd LoadBlob" command is provided by the client in relation to any of the required key(s) which are stored on or accessible to the HSM device 21. When the load command is executed, the keys referred to in the command are retrieved, decrypted and stored in the HSM internal RAM. A key handle is created that refers to the result. The ACL is stored associated with the corresponding key, e.g. in the same location.

For any keys that are to be imported into the HSM device 21, including the program "key" 47, a "Cmd Import" command is used. This command is supplied with the key and corresponding ACL directly, not encrypted in any way. This command loads a key and ACL given in plain text from the client device 317 into the HSM device 21. When the import command is executed, the key and ACL provided with the command are stored in the HSM internal RAM 309. A key handle is created that refers to the result. The ACL is stored associated with the corresponding key, e.g. in the same location. This process is used for loading a key without any encryption of the key. It may be suitable for loading the client program for example, which does not require encryption. The import command creates the binding between the program key and its ACL.

In the example described here, the program "key" 47 is prepared in the client device 317 and transmitted to the HSM device 21 together with the bound ACL and the "Cmd Import". However, generally the various keys may be loaded or imported into the HSM RAM 309 in various ways. For example, the keys may be imported, or decrypted from a wrapped form, or may be the result of earlier key derivation operations. Different keys may be obtained in different ways, for example, the program "key" 47 and template "key" 45 are imported, whereas the input key(s) are loaded from storage within or accessible to the HSM 21. The precise means of entering the keys into the HSM 21 is immaterial. Optionally, at least one key will be entered into the HSM in a way that preserves its confidentiality and the binding to the policy (ACL) controlling its use.

In this step, a first data packet 42, comprising the program "key" 47 and the program ACL 48, is obtained. The program ACL 48 is also referred to as the third ACL 48. The program "key" comprises a representation of a client program that defines a cryptographic algorithm. The third ACL 48 is an example of a third policy associated with the client program. The program ACL 48 is associated with the program "key" 47. In this example, the program "key" 47 and program ACL 48 are serialised, and then bound. For example, the serialised client program 47 and the corresponding serialised access control list are bound by the import command. The program "key" 47 comprises a representation of computer program code embodying the algorithm desired by the user, the client program. The serialised program code comprises a series of bits. At the HSM 21, the program "key" 47 and program ACL 48 are de-serialised and stored together in the HSM internal RAM 309. A key handle is created that refers to the result.

In the de-serialisation step, the serialised program 47 and program ACL 48 are read at the HSM device 21 according to the serialization format. The serialised program 47 is converted into a form which can be executed on the HSM device 21. In this case, the serialised program is converted into an in-memory representation of the program. The code for de-serialising the program 47 is included in the firmware of the HSM device 21. Alternatively, the serialised client program may be translated into machine code. The serialised representation could also be executed directly, if this functionality was coded into the firmware, for example. In this case, the de-serialisation step is not performed, and the serialised representation is simply stored.

A third data packet 41, comprising the template "key" 45 and the template ACL 46, is also obtained. The template "key" 45 comprises a representation of output access control information relating to use of output data. The template ACL 46 is also referred to as the fourth ACL, and is associated with the template "key". The fourth ACL is an example of a fourth policy associated with the output access control information. In this example, the template "key" 45 and template ACL 46 are serialised, and then bound, for example they may be provided in an import command or cryptographically bound and loaded. The serialised template comprises a series of bits. At the HSM 21, the template "key" 45 and template ACL 46 are de-serialised and stored together in the HSM internal RAM 309. A key handle is created that refers to the result. As for the program key 47, in the de-serialisation step, the serialised template 45 and template ACL 46 are read according to the serialization format.

A second data packet 43, comprising input key #2 49 and its ACL 50, is also obtained. The ACL 50 of the input key #2 is also referred to as the first ACL. The first ACL is associated with the input key #2. In this example, it is cryptographically bound to the input key #2. For example, they may be encrypted under a long-term symmetric key held in the HSM device 21, and stored in storage accessible to the HSM device 21. The input key #2 may be referred to as second data. The first access control list 50 comprises a list of permissions relating to use of input key 2. The first access control list is an example of a first policy associated with the second data.

A fourth data packet 44, comprising input key #3 51 and its ACL 52, is also obtained. The ACL 52 of the input key #3 is also referred to as the fifth ACL. The fifth ACL 52 is associated with the input key #3. In this example, it is cryptographically bound to the input key #3. For example, they may be encrypted under a long-term symmetric key held in the HSM device 21, and stored in storage accessible to the HSM device 21. The input key #3 may be referred to as fourth data. The fifth access control list 52 comprises a list of permissions relating to use of input key #3. The fifth access control list 52 is an example of a fifth policy associated with the fourth data.

The client sends a "Cmd LoadBlob" command in relation to input key #2 and input key #3 to the HSM 21. When the load command is executed at the HSM 21, the input key #2 and input key #3 blobs are retrieved, decrypted and the keys stored in the HSM internal RAM 309, together with the ACLs. Key handles are created that refer to the results.

In this example each ACL is bound to the corresponding object. The input keys are cryptographically bound to the ACL. The cryptographic technique used to secure the key material (i.e. the creation of the blob) guarantees both confidentiality and integrity, i.e. an attacker cannot discover the contents of the blob, and they cannot modify it without detection. The access control list defines the policy under which a key may be used. The access control list comprises a collection of permission groups. Only one permission group has to match for an action to be permitted.

Each ACL comprises a table of permission groups, each of which defines a set of operations and the credentials required (if any) to perform them. Permission groups are checked in order, where the first permission group that permits the action is used. If no group matches the desired operation then the command will return an error message. A permission group is one entry in an access control list. It defines a collection of operations and the credentials required to perform them (if any). It comprises a collection of general restrictions, plus a list of actions, which are matched directly against the action to be performed. An action defines one or more operations which are allowed. There are many possible different actions. "Act_DeriveKey" is the action that represents any attempt to use the command "Cmd_DeriveKey", described above. For a Derive Key operation, for each key participating, the key's ACL should comprise an Act_DeriveKey entry in which the role field matches the role in which the key will be used, the mech field matches the requested mechanism (i.e. the first mechanism), and for each other role, the otherkeys field either does not mention that role, or mentions the key hash of the key acting in that role.

For example, if it is desired to constrain which input keys can be used with the program key, the program key ACL 48 lists the permitted input keys together with the roles (e.g. ("DeriveRole WrapKey", "DeriveRole Key3"). Thus in the present example, the program ACL 48 may list an Act_DeriveKey entry in which the role field lists "DeriveRole BaseKey" (which may be identified by the numeric constant 1), the mech field lists "DeriveMech Programmed" (which may be identified by the numeric constant 42), and the otherkeys field does not mention the "DeriveRole TemplateKey", lists the role "DeriveRole WrapKey" (which may be identified by the numeric constant 2) with an identifier of the input key #2 (which may be a cryptographic hash of the key value and type) and lists the role "DeriveRole Key3" (which may be identified by the numeric constant 3) with an identifier of the input key #3 (which may be a cryptographic hash of the key value and type). The roles may include "template", "program" and various generic input roles, but further or alternative specification of the roles may be defined, to differentiate between the different roles of the different input keys for example. The key types also include "template" and "program", however the cryptographic key types may take various known cryptographic key types, such as an AES key for example.

If it is not desired to constrain which keys can be used in a particular role with the object, that role is not listed in the ACL of the object. In this case, any key can be used in the role (so long as it is permitted by the ACLs of the other objects used in the mechanism). Thus for example the program ACL 48 does not list the role "template", meaning that the program "key" 47 may be used with any template "key".

In this step, the various keys and ACLs are decrypted, de-serialised where required and stored in RAM. Each key is stored in such a way that it is associated with its ACL.

A client, or an application acting on behalf of a client, then requests that the first mechanism be performed, in a command comprising an identifier of the first mechanism and a reference to each of the keys to be used. The command "DeriveKey" is used, taking as argument the mechanism identifier and the list of two or more keys. The mechanism identifier identifies the first mechanism, "DeriveMech Programmed". The command may be sent from the client device 317 to the HSM device 21. Although here a case is described in which the program key and the command are both sent from the same client device 317 to the HSM device 21, it is to be understood that the program key and the command may be sent to the HSM device 21 from separate devices.

Each key is again assigned to a particular role in the command. This may be defined by the order they are presented in the command—the first key in the list is the template key, the second is the program key, and the subsequent keys occupy sequentially numbered roles for example. Various different orders or methods of defining the roles may be used however.

Figure 5:
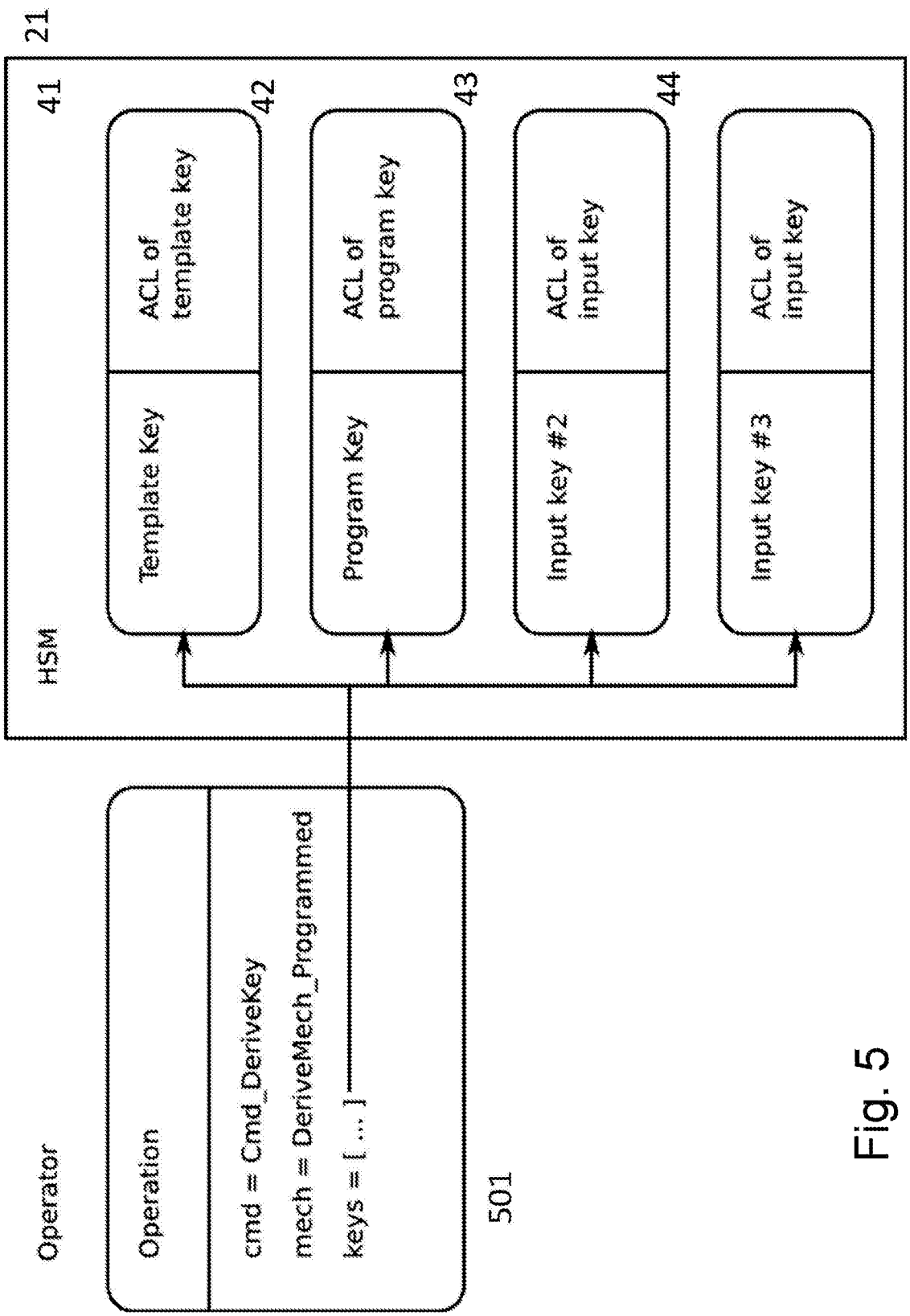
FIG. 5 shows an example of a request for a first mechanism to be performed and is received as part of a computer implemented method of performing a cryptographic algorithm on a device in accordance with an embodiment.

FIG. 5 shows an example of a "Cmd DeriveKey" command 501. Computer program code in the firmware on the HSM device 21 is identified by the "Cmd DeriveKey" command and executed. This code embodies the steps S301 and S303 illustrated in FIG. 3. The code may be identified using a table on the HSM device 21 including a command identifier. The command identifier may be a numeric constant. The "Cmd DeriveKey" command may be identified by the numeric constant 75 in the client request, and the memory address of the code to be executed in response to the "Cmd DeriveKey" command on the HSM device 21 retrieved.

The "Cmd DeriveKey" command 501 comprises information identifying the first mechanism, "DeriveMech Programmed". The mechanism identifier may be a numeric constant. For example, the first mechanism "DeriveMech Programmed" corresponds to the identifying numeric constant 42. This mechanism identifier allows computer program code in the firmware on the HSM device 21 to be identified. This code specifies the step S302 illustrated in FIG. 3. This code embodies the functionality for executing the program provided in the program key.

The command 501 further comprises information identifying the first data packet 42 as comprising a representation of a program to be executed, the third data packet 41 as comprising a representation of a second access control list for the output key, the second data packet 43 as comprising input data, and the fourth data packet 44 as comprising input data. The different roles of different inputs may also be defined by the order. This identifying information may comprise a list of key identifiers, ordered such that the first identifier in the list identifies the template key, the second the program key, and the subsequent occupy sequentially numbered roles. The keys may be identified by a key handle or filename, which allows the corresponding key stored in RAM on the HSM device 21 to be identified. A step of requesting the first mechanism to be performed is carried out by sending the command 501 to the HSM device 21 from the client device 317.

In step S301, a first determination is performed as part of the Derive Key operation. In this step, all of the constraints in all of the ACLs of the objects used in the operation are checked. If all of the constraints are met, the process moves to S302. If any of the constraints is not met, the operation is terminated at this stage. In this case, the program represented in the program key 47 does not execute.

For a Derive Key operation, for each key participating, that key's ACL is searched for an Act_DeriveKey entry in which the role field matches the role in which the key will be used, the mech field matches the requested mechanism (i.e. the first mechanism), and for each other role, the otherkeys field either does not mention that role, or mentions the key hash of the key acting in that role. For example, the template "key" ACL 46 must allow the template 45 to be used in the template role. The program "key" ACL 48 must allow the program 47 to be used in the program role.

As described previously, each object may constrain the keys permitted to be used in one or more of the roles, by listing the permitted keys together with the role in the otherkeys field. An object for which the ACL does not list a particular role does not constrain that role, and therefore no check for that role need be made. The first determination thus comprises, for each ACL, a first step of determining whether each role which is included in the command is listed in the ACL, and then a second step of determining, for each role listed, whether the key identified in the role in the command 501 is included in the list in the ACL. If any key is identified in a role in the command 501 for which there is a constraint in an ACL, and the key does not meet the constraint, the first determination fails.

In this example, the first determination thus comprises determining whether the first access control list 50 of input key #2 permits input key #2 to be used in the first mechanism, in the role to which is has been assigned, i.e. in this case as "DeriveRole WrapKey". This is confirmed by comparing the actions in the ACL 50 to the command 501, the mechanism identifier in the relevant action against the mechanism identifier in the command 501, and the role in the relevant action against the position in the order of the input key #2 identifier in the command 501. Note that although the first input key role is labelled as a "Wrap key", the first key is not necessarily used as a wrap key, but may perform any role specified by the cryptographic algorithm.

In this example, the first access control list comprises a constraint relating to the program key. Thus the first access control list comprises one or more identifiers of keys in the program role. The first determination thus further comprises determining whether the first access control list 50 of input key #2 permits input key #2 to be used with the program "key" 47 identified in the command 501. The first ACL 50 comprises a list of identifiers of all permitted keys in the "DeriveRole BaseKey" role, i.e. the program role. For example, the first ACL 50 comprises a cryptographic hash (such as SHA-1 or SHA-256) of the key type and key material for all permitted keys. In the case of the program key the "key material" is the serialised program. A cryptographic hash using the same hash function is taken of the program key 47 identified in the command 501 together with the key type "program" in S301. This is then compared to the list in the first ACL 50. If there is no match, the first mechanism is stopped and an error message returned. The program code in the program key is not executed.

Any further constraints are also confirmed. Each key may optionally constrain the identities of some or all of the other keys. For example, any of the input keys may constrain the ACL of the derived key, by constraining the template key with which they may be used. Optionally, the first access control list comprises a constraint relating to the template key, i.e. the first access control list comprises one or more identifiers of keys in the template role. The first determination thus further comprises determining whether the first access control list 50 of input key #2 permits input key #2 to be used with the template "key" 45 identified in the command. This is confirmed in the same way as described above, where in the case of the template "key", the "key material" is a serialised ACL.

The program "key" may also constrain the other keys. For example, the third access control list may comprise a constraint relating to the input key, i.e. the third access control list comprises one or more identifiers of keys in the various input roles. The first determination thus further comprises determining whether the third access control list permits the computer program code in the program "key" 47 to be used with the first input key #2 as input data, and/or to be used with the second input key #3 as input data. In this way, the program may constrain what key(s) it may operate on. Authorisation may thus be two-way, in that a program's ACL may constrain the keys it operates on, just as a key's ACL may constrain the programs that can operate upon it. It may additionally or alternatively be determined whether the third access control list permits the computer program code in the program "key" 47 to be used with the template key 45 as a template. Such checks are performed in the same manner as has been described above, by comparing cryptographic hash of the key identified in the command 501 to that in the third ACL.

The template "key" may also constrain the other keys. For example, the fourth access control list may comprise a constraint relating to the input keys, i.e. the fourth access control list comprises one or more identifiers of keys in the input roles. The first determination may further comprise determining whether the fourth access control list 46 permits the template 45 to be used with the input key #2 as input data, and/or to be used with the second input key #3 as input data. It may additionally or alternatively be determined if the fourth access control list 46 permits the template 45 to be used with the program 47 as program data. Again, such checks are performed in the same manner as has been described above, by comparing cryptographic hash of the key identified in the command 501 to that in the fourth ACL.

Figure 6:
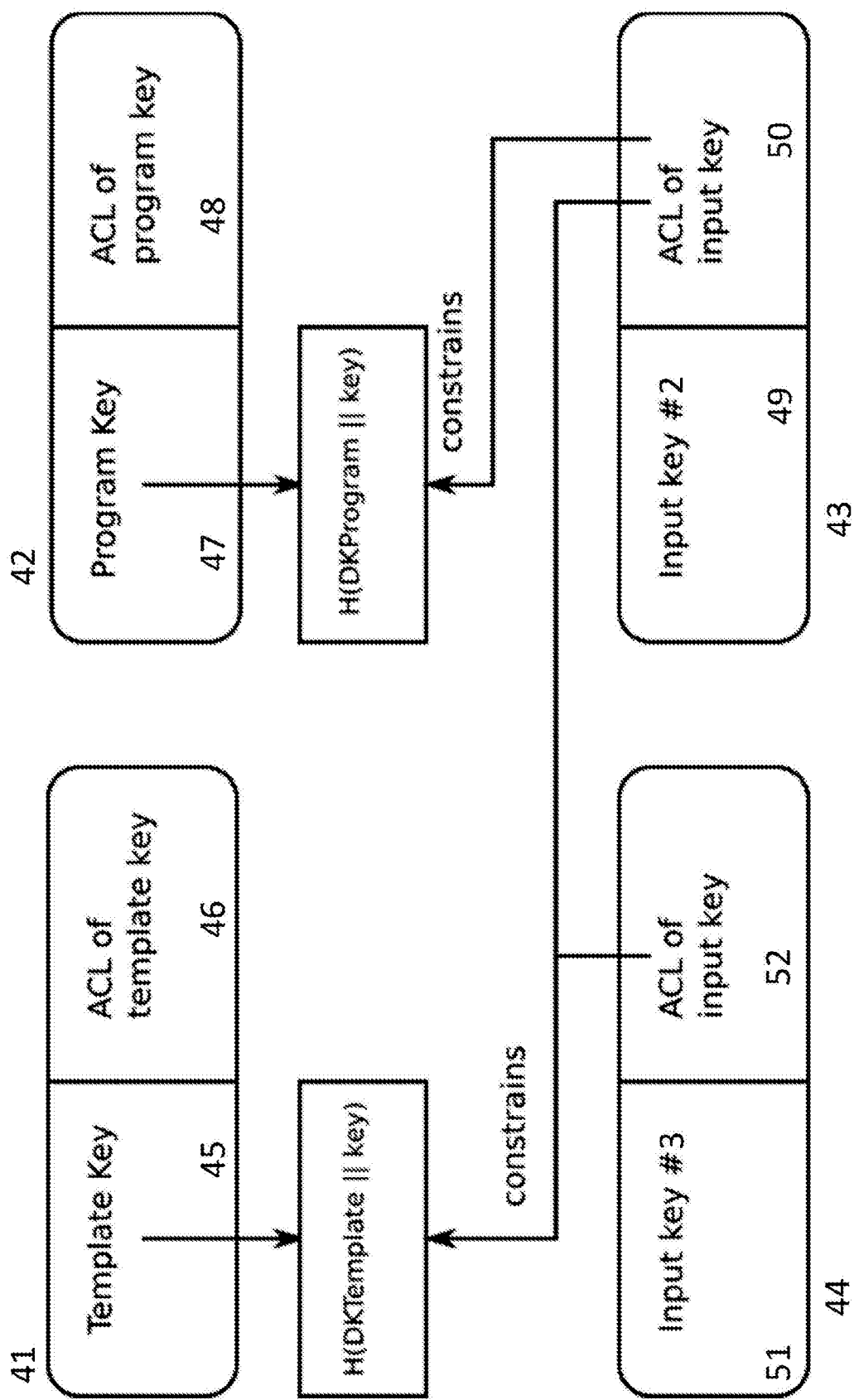
FIG. 6 shows an example of how one input key may constrain another input key as part of a computer implemented method of performing a cryptographic algorithm on a device in accordance with an embodiment.

In the example shown in FIG. 6, input keys 2 and 3 constrain the template key 45. Thus the ACL of both input key #2 and input key #3 lists an identifier of the template key 45 together with the role "template". One or more identifiers of other template keys may also be listed together with the "template" role. Input key #2 constrains the program key 47, thus the ACL of input key #2 lists an identifier of the program key 47 together with the role "program". Again, identifiers of other programs may also be listed with the "program" role in the ACL of the input key #2. However, input key #3 does not constrain the program key, and therefore the role "program" is not listed in the ACL of input key #3. During the first determination, it is checked whether the template key 45 is identified in the list of keys having the "template" role in the ACL of the input key #2 and input key #3. It is also checked whether the program key 47 is identified in the list of keys having the "program" role in the ACL of the input key #2. No check as to whether the program key 47 is identified in the ACL of the input key #3 is made, since the ACL of the input key #3 does not comprise the "program" role ("DeriveRole BaseKey"). As explained above, the constraint can be expressed as a cryptographic hash (such as SHA-1 or SHA-256) of the key type and key material. In the case of the template key the "key material" is the serialised ACL, while for the program key it is the serialised program.

If the first determination is successful, i.e. if all of the constraints in all of the ACLs are met, the process moves to S302. If any of the constraints is not met, the mechanism is terminated at this stage. In this case, the program 47 does not execute. Thus when the first mechanism is performed, the policy (ACL) of each key is checked to determine whether the key may participate in the action in its selected role. Each key's ACL may also constrain the values of the keys in the other roles. If any ACL check fails the whole operation fails at this stage. An error message informing the client may be transmitted in this case.

In S302, the cryptographic algorithm embodied in the client program is performed, taking the input keys as input in their designated roles (which in this case are defined by the order in which they are listed in the command 501). The output of S302 is a derived key. S302 comprises executing the program 47 stored in the RAM, taking the input keys #2 and #3 as input.

In this example, the contents of the program key are interpreted as a program in a domain-specific language. As has been described above however, the client program may alternatively be provided in a general-purpose computer language such as Python. In this case an interpreter is executed on the HSM device 21 in S302 that directly executes the Python instructions in the client program. Alternatively, the client program may be provided in compiled code, in which case this is executed directly on the HSM device 21.

In the present example, the HSM firmware comprises program code embodying an interpreter. The interpreter code is identified by the "DeriveMech Programmed" mechanism identifier and executed in S302. The interpreter reads in the in-memory representation of the client program, and implements it using machine code stored on the HSM device 21 as part of the firmware. For example if it finds an in-memory representation of a 'sign' operation, it calls machine code corresponding to the sign function. Each function is identified by the interpreter and implemented in machine code.

The functions take as inputs values assigned to "registers". The registers are variables referenced by code in the HSM firmware. In S302, the input keys (excluding the template key and program key) are assigned to registers in a consistent way, by the HSM firmware. The outputs of functions may also be assigned to registers by the client program code. Registers may also be assigned specific values by the client program code or default values by the firmware code for example. A maximum number of registers is defined in the firmware. During the Derive Key operation, each register corresponds to a separate physical memory address.

The functions include a branching function and one or more cryptographic functions, for example one or more of hashing, signing, encrypting and decrypting. In an embodiment, the functions include one or more of: concatenation, slicing, hashing, signing, encrypting, decrypting, loading constant values, converting between byteblocks and integers, taking a length, performing binary operations such as addition or subtraction, branching based on the results of comparing, and raising errors. The custom representation used by the client to write the algorithm is thus limited to a restricted set of approved functions. These may be combined by the client in various ways to generate a desired algorithm. In this manner, some control over the range and type of functions that can be performed on the device is retained, whilst allowing the client to combine these approved functions more easily in various ways, in a single operation. Furthermore, it can be assured that each base function meets any relevant security standards. For example, various checks may be built into these base functions. In general, the set of functions can be anything that the implementer can express. The definitions and code embodying the functions are included in the firmware stored on the HSM device 21.

The language is capable of branching and looping, for instance to make conditional decisions based on the inputs or to generate sequential output of a desired length. By writing a program using the custom representation, in which commands correspond to a fixed set of functions for which definitions and code embodying the function are stored on the HSM device 21, a client may implement any cryptographic algorithm that can be represented using the functions, without having to carry out a firmware upgrade.

The necessary supporting files and applications to execute the functions are stored on the HSM device 21. This may comprise runtime system files, definitions for the various functions, and machine code corresponding to the various functions.

In the example described here, the language is based on a register machine. It uses multiple, uniquely addressed registers, each of which holds a value, for calculations. The registers are typed. In this example, the possible types are integer (represented here by i), byteblock (represented here by b) and elliptic curve point. Additional types could be added. Using registers can allow errors in the program to be handled more straightforwardly. The maximum number of each type of register to be used are set initially in the client program. If more than these limits are required, the program stops immediately. Furthermore, mapping each variable to a physical address provides stability, and therefore provides a security improvement. A stack based architecture could alternatively be used however.

The client program commits to the maximum number of each type of register it will use. When the client program starts, the input keys (excluding the template key and program key) are assigned to registers in a consistent way by the firmware, in S302. Any registers not thus assigned are given a default value (e.g. 0 for an integer register).

In this example, if all ACL checks succeed, then the values of the input keys #2 and #3 are assigned to registers and the algorithm described in the program 47 is executed. If that does not encounter an error then the output of the client algorithm, the derived key, takes the result of the algorithm as its value and the value of the template key as its ACL, as described in S303 below. The algorithm comprises functions from a set including one or more of: concatenation and slicing of byteblock registers; hashing, signing, encrypting and decrypting of byteblock registers; loading constant values into registers; converting between byteblocks and integers; taking the length of a byteblock register; performing binary operations such as addition or subtraction on integer registers; branching based on the results of comparing integer registers; and raising errors.

The client program 47 comprises a series of steps, each comprising a function and its parameters. Each step performs some function on zero or more registers and may either proceed to the next step, or branch to another location in the client program. If the last step in the program is not a branch then the client program terminates after it has been executed. The derived key is taken from register values in a consistent way dependent on the target key type specified by the client program.

Figure 7:
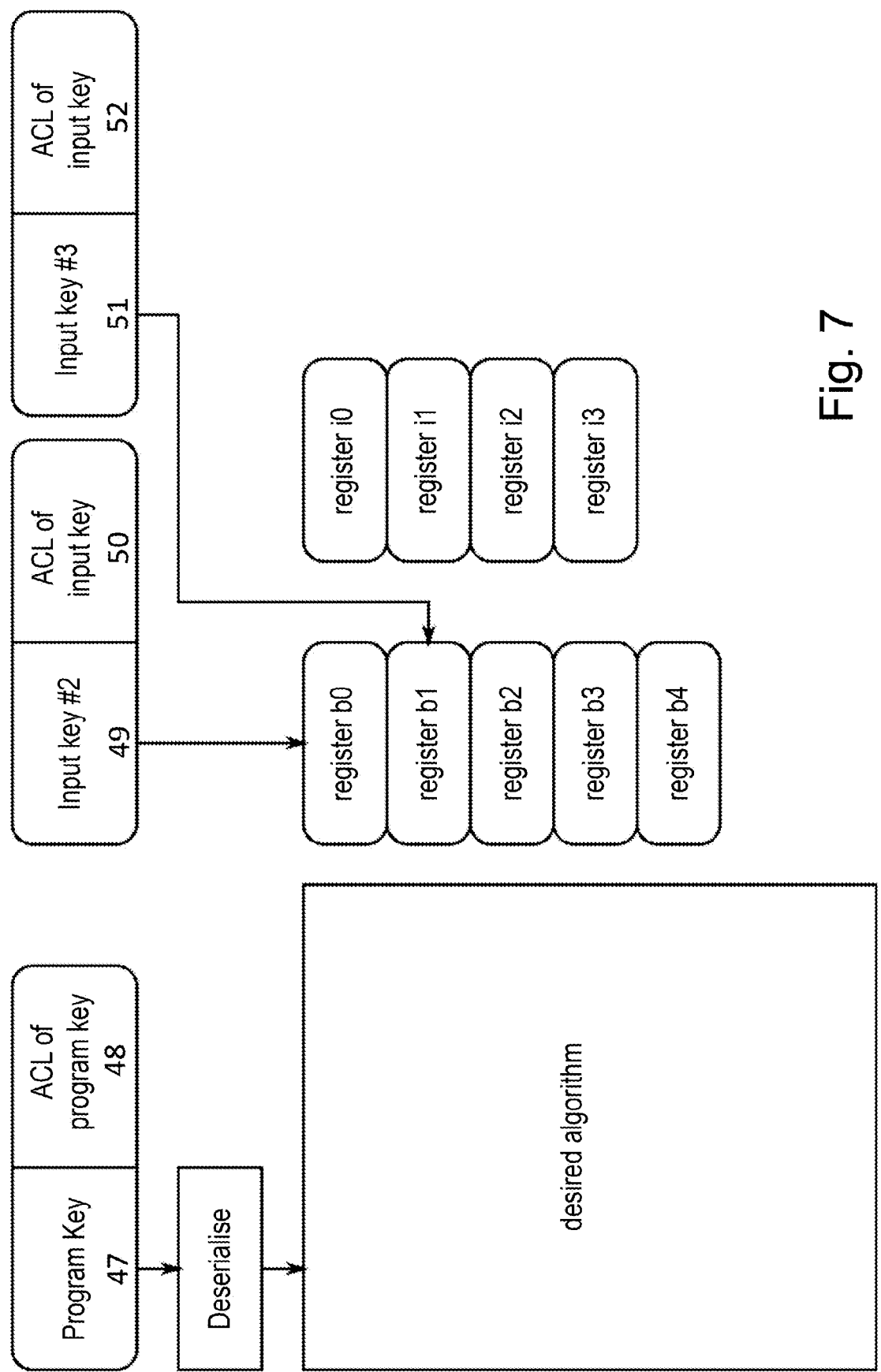
FIG. 7 shows part of a computer implemented method of performing a cryptographic algorithm on a device in accordance with an embodiment.

Further detail of the steps performed within S302 are shown in FIG. 7. In the example shown in FIG. 7, the client program is an implementation of a National Institute of Standards and Technology (NIST) feedback Key Derivation Function (KDF) from SP800-108. The values of the input keys #2 and #3 are assigned to registers by the firmware. The value of input key #2 is assigned to register b0, and the value of the input key #3 is assigned to register b1. As has been described previously, the program 47 has already been de-serialised and stored in the RAM.

A textual representation of the client program is reproduced again below. The first two lines define the number of input keys required, including the program and template keys, and the type of the derived key that will be computed. The "Unpack" function loads integer register i0 with an integer taken from the 4 bytes at offset 0 within byteblock register b1. This is the desired length of the derived key. In this particular client program, the desired length of the derived key is set based on the input key #3, however the length of the derived key may be set in various different ways. For example, a fixed limit of 32 bytes may be set. The LoadInt functions set the integer registers i1 and i3 to 1. The Load Bytes function sets the byteblock register b1 to empty.

The code between "loop" and "done" is the implementation of the repeating part of the algorithm. It will not be explained in detail, since this is included only as an example algorithm that can be implemented. However, the conditional "Branch" function at the start exits the loop when enough output has been generated. The "Sign" function is the core cryptographic step of the algorithm. Definitions of the "Branch" and "Sign" functions are included in the firmware on the HSM device 21, as well as machine code embodying these functions. The final two lines truncate the output (which may be a bit too long) to the desired length.

```
.nkeys 4
.keytype Random
Unpack 0 i0 b1 #0 #4
LoadInt i1 #1
LoadInt i3 #1
LoadBytes b1 .
loop:
    GetLength i2 b4
    Branch i2 GE i0 done
    Pack 0 b1 #0 #1 i1
    BinaryOp i1 i1 Add i3
    Concatenate b2 b1 b2
    Concatenate b2 b2 b3
    Sign b2 b2 b0 Rijndael RijndaelmCMAC
    Concatenate b4 b4 b2
    Branch i0 EQ i0 loop
done:
    LoadInt i1 #0
    RegSlice b0 b4 i1 i0
```

If an error occurs during program execution, either because an error is explicitly raised, or because an impossible operation is attempted, an error is returned to the client.

Otherwise when the program completes, yielding a derived key, the contents of the template "key" 45 are bound to the derived key in S303. A reference to the result is returned to the client, who can then use it like any other key (within the constraints defined by the ACL). Thus in S303, a second access control list is generated and associated with the output key. The second access control list is generated from the template 47 information stored in RAM, and cryptographically bound to the output key for example. The second access control list and the output key are encrypted with a symmetric key for example.

In the above described method, de-serialisation code running on the HSM device 21 converts the serialised representation of the client program (i.e. a bit string) into a data structure in memory representing the client program, i.e. an in-memory representation corresponding to the client program. The in-memory representation may be an array, which is populated during the de-serialisation process. Each element of the array corresponds to a step in the client program, identified by the corresponding numeric constant (e.g. "sign" is identified by the numeric constant 5).

The de-serialisation code is part of the firmware stored on the HSM device 21. Definitions of the functions and machine code embodying the functions are also included in the firmware. During execution of the client program, the interpreter reads in the in-memory representation of the client program, i.e. the array, and implements it using the machine code embodying the functions. For example if it finds an in-memory representation of a 'sign' operation (the numeric constant corresponding to the sign operation), it calls the machine code corresponding to the sign function. Alternatively, the array may contain the memory address of the machine code in HSM memory embodying the step, in which case the lookup to find the machine code is not required each time the step is executed.

Figure 8:
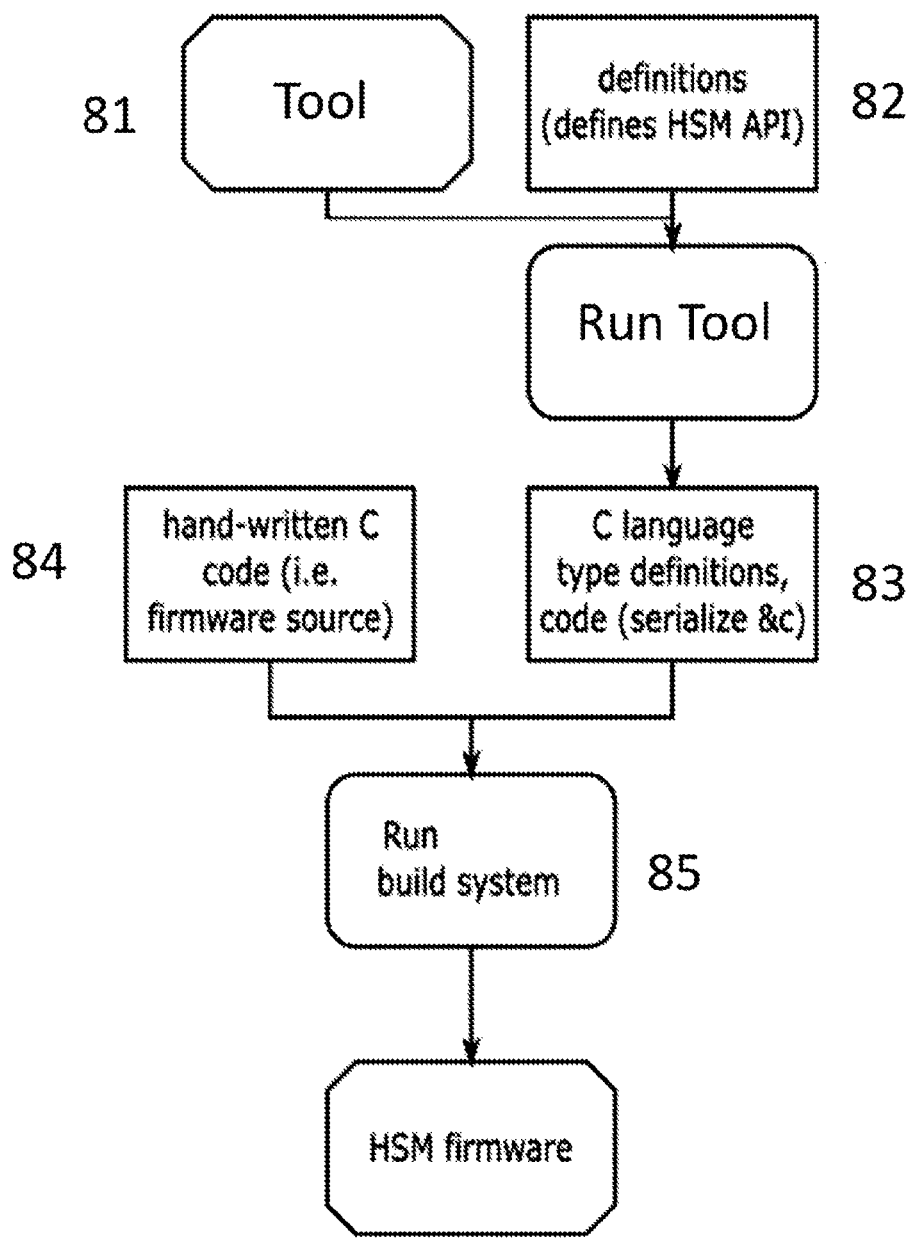
FIG. 8 is a schematic illustration of an example process for generating HSM firmware which is used as part of a computer implemented method of performing a cryptographic algorithm on a device in accordance with an embodiment.

A process for generating the HSM firmware, including the above described code, will now be described in relation to FIG. 8. The HSM firmware is generated on a server of a trusted party, and then introduced to the HSM during manufacture or as a download or update. Thus the following steps are performed on the server of the trusted party.

To generate the HSM firmware code, a tool 81 is used to generate language-specific representations of data types (including the functions), and to generate language-specific code, including code to generate a serialised representation of the data types and to de-serialise serialised representations of the data types, and the interpreter program. The data types include a data type corresponding to each of the functions (Sign, Branch, etc) in the set of functions available to the client to use as part of the client algorithm. In this example, the language is C. The tool 81 runs in a build system of the trusted party, for example on servers in a data centre of the trusted party.

A syntax is associated with the tool 81. The syntax describes the data types, in a language-independent way. The tool 81 is used to automate part of the process of developing the HSM firmware. The syntax defines the format of the commands sent to the HSM and the replies it sends back. The format of the client program is also defined by this syntax (i.e. the data types corresponding to the set of functions), however, the client program is not represented in the syntax. Rather, a text representation of the program is written by the client using the custom-representation as described above.

Objects in the syntax have types, which determine what values they may hold and how they are used. Some types, called primitive types, are built in to the tool 81. The syntax provides a way of defining new types. The built in types may include:

Word: represents integers in the range $0<=n<=4294967295$;

Bignum: represents integers without any inherent bound—in practice implementations may impose some kind of limit;

Byteblock: represents sequences of bytes—in principle any length up to 4294967295 is permitted, but in practice implementations may have smaller limits.

In the syntax, some ways of defining new types include:

An enumeration type: a collection of names with associated numeric values. Values of enumeration types can also have structure types associated with them.

A bitmap type: a collection of up to 32 bit named flags, each of which can take the value 0 or 1.

A structure type: a sequence of fields, each of which has a name and a type.

Fields in a structure can have any type. Fields can be optional—in this their presence or absence in a structure depends on the value of a flag in a bitmap in the same structure. Fields can be tables, meaning that they can hold 0 or more values of their type (normally they hold exactly 1 value). Fields can be variadic, meaning that their type depends on the value of a field with an enumeration type in the same structure. Specifically, the type is the structure type associated with that value.

In the syntax, type names, enumeration value names and (with certain exceptions) flag names normally start with capital letters. Field names in structures normally start with lower-case letters.

A language binding comprises a convention for mapping these concepts into the concepts of the target language (e.g. C, Python). The tooling 81 implements this mapping.

The input 82 of the tool 81 is a collection of data types, represented in the syntax, including data types corresponding to each of the functions (Sign, Branch, etc). An excerpt from an Application Programming Interface (API) definition is shown in Appendix 1. This is an excerpt from a definition document, with the human-readable commentary in square brackets, which forms the API documentation. The excerpt lists the data type definitions in the syntax. These data types expressed in the syntax are taken as input to the tool 81 and the tool 81 is run on the trusted party server.

The output of the tool 81 is a language-specific representation of those data types, i.e. the same types represented in C syntax, and code that operates on those data types. Specifically, serialisation C code and de-serialisation C code that operates on these data types is output. This is combined with further C code, including C code embodying the functions (Sign, Branch etc), C code embodying the interpreter, C code embodying the first mechanism and the Derive Key operation, and C code embodying any other desired functionality of the HSM device 21.

The tool 81 generates C code and C language type definitions (C structures). This is combined with further C code 84. A compiler is run in step 85. The compiler generates compiled machine code, i.e. native code that is compiled to run on the HSM device 21.

This is the HSM firmware. The HSM firmware is then introduced to the HSM during manufacture or as a download. The firmware then runs on the HSM device 21. The code running on the HSM, i.e. 'the firmware', is machine code, implementing both existing HSM functionality as well as the functionality described herein. The firmware may comprise hand-written code as well as portions generated by the tool 81. Primarily, the tool 81 generates serialization and deserialization code.

The tool 81 may also be used to generate code in a range of programming languages for use on general-purpose computing platforms, for example Java or Python. For example, as has been described above, the client writes a textual representation of the program code, i.e. a text file, using a custom-designed representation. The custom designed representation is closely related to the syntax, in the sense that the functions in the custom representation (Unpack, LoadInt, Sign, Branch) map directly to the definitions in the syntax. It is not written in the syntax however. A translator 87 is executed on the client machine 317 to translate the textual representation into a serialized form. As well as being used to generate the firmware, the tool 81 may also be used to generate the translator 87, in the manner described below.

The translator 87 comprises Python code. A process for generating the translator 87 will now be described in relation to FIG. 9. The translator code is generated on a server of a trusted party, and then introduced to the client machine 317 as a download for example. Thus the following steps are also performed on the server of the trusted party to generate the translator 87.

As described before, the tool 81 is run on the trusted party server, this time to generate Python code. The output of the tool 81 in this case is language-specific (in this case Python) representations of the data types, i.e. Python language type definitions, and Python code. This forms the translator 87. The translator 87 comprises code that translates a text representation of the client program into Python source code, and code that translates the Python source code into a serialised representation, using the Python language type definitions.

As has been described above, the client writes a textual representation of the program code, using a custom-designed representation. The translator 87 is executed on the client machine 317 to translate the textual representation into a serialized form. The translator 87 unpacks the text representation, recognises each data type and builds Python source code corresponding to the client program, using the Python language type definitions. In particular, the Python definition corresponding to the DKProgram data structure described in Appendix 1 describes the Python structure corresponding to a client program. The translator 87 builds the Python source code representation of the client program comprising an array of program steps using this definition.

The serialisation code then serialises this Python source code, i.e. converts the Python source code into a bit string, using the numeric constants corresponding to each data type. The translator 87 thus runs on the client machine 317 and generates a serialized representation of the program, in the format expected by the HSM 21. A consistent serialization is used throughout, such that there is one true byte string (i.e. serialization) for any given client program.

In this case, the translator 87 maps from the textual representation to program source code, i.e. Python code, and then from the Python code to the serialised representation. However, it could alternatively be configured to map from the textual representation to an in memory representation, and then to a serialised representation. Alternatively, it could map directly from the textual representation to the serialised representation.

The bit string representation of the client algorithm is transmitted from the client machine 317 to the HSM device 21. The client includes the serialized representation in their application and submits it to the HSM device 21 when they wish to make use of the algorithm.

Figure 11:
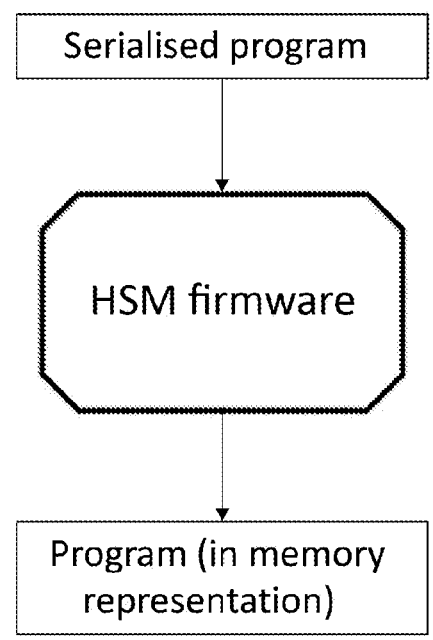
FIG. 11 is a schematic illustration of an example process for deserializing a representation of a program into an internal format that is suitable for execution as part of a computer implemented method of performing a cryptographic algorithm on a device in accordance with an embodiment.

The HSM device 21 receives the serialized form of the client program and deserializes it into an internal format that is suitable for execution, as has been described previously. This process is illustrated in more detail in FIG. 11. As described above, the de-serialisation code takes as input the bit string, which is the serialised representation of the client program code, and converts it into an in-memory representation. This is a data structure in memory representing the client program, and is a convenient format for the HSM device 21 to execute. The in-memory representation may comprise an array in which each entry corresponds to a step in the client program, identified by the numeric constant corresponding to the function. This de-serialisation step is performed when the serialised program is received at the HSM device 21. The program ACL, template, and template ACL are also de-serialised using the same de-serialisation code.

When executing the program in S302 described above, the interpreter on the HSM device 21 executes, and works through the in-memory representation of the program. The numeric constant is used to retrieve machine code in the firmware corresponding to the function. For example if it finds an element comprising the numeric constant corresponding to a 'sign' operation, it calls its own sign function, i.e. it executes the machine code in the firmware of the HSM device 21 corresponding to the sign function.

As mentioned above, it would also be possible to deserialize directly to the machine code address. In this case, the memory address of machine code in the firmware corresponding to the function is stored in the array.

The de-serialisation code running on the HSM device 21 may alternatively be configured to convert the serialised program into machine code. In this case, the serialised representation of the client program is translated into native code, and the CPU executes it directly. The interpreter is not required. The serialised representation could also be used directly, if this functionality was coded into the firmware for example.

Although in the above example, a tool 81 is described to generate part of the firmware and the translator, the firmware and translator code may be generated in various other ways.

An excerpt from an API definition document is shown in Appendix 1, with human-readable commentary in square brackets. The API runs on the HSM device 21, and interacts with the firmware. The API handles incoming commands to the HSM 21 and outgoing replies from the HSM. The API also defines the serialisation format, the ACL structure, etc. The definitions are in the language non-specific syntax described above, and are described in more detail below by example.

Within a computer program the definitions are represented as data structure definitions in whatever specific programming language is being used. Thus when the HSM firmware is generated as described above, data structure definitions in C code corresponding to the definitions in Appendix 1 are included in the C language type definitions in FIG. 8, and these are compiled into machine code in step 85. For example, the "Sign" function is represented as a C structure with fields called brdest, brmsg etc. Machine code corresponding to the sign function is also included in the firmware. The DKProgram definition, which is the definition for the client program data structure, is also translated to a C struct called M_DKProgram with fields called flags, nbbr, nir, etc. Similarly, within the translator 87, Python language definitions are used.

Each data type, i.e. each definition, is accompanied by generated code which will translate it from and to sequences of bytes in a consistent but language-neutral way, i.e. the serialisation and de-serialisation code described above, included in the HSM firmware and in the translator 87 on the client machine. The byte sequence format is used when communicating between the client machine 317 and the HSM device 21. The numeric values are used to give the serialized form of the enumeration type.

The definitions DeriveRole WrapKey=2 and DeriveRole Key3=3 in the Appendix 1 define two of the values of the DeriveRole enumeration, used for input key #2 and input key #3 respectively.

The DKProgramOp LoadInt=8 and DKProgramOp GetLength=9 definitions define two values of the DKProgramOp enumeration, each with an associated structure. These correspond to functions that may be used in the client program. The structures are translated into language-specific representations (e.g. a struct in C or a class in Java) by the tool 81. Each structure as a whole is serialized by serializing each of its fields in order. The DKProgramStep definition defines a structure called DKProgramStep, with two fields. There is a relationship between these two fields. The first, op, has enumeration type. This controls what type args will take. The second, args, has type depending on the value of op. If op=8 then the Args structure from DKProgramOp LoadInt is used. If op=9 then the Args structure from DKProgramOp GetLength is used. The same principle applies for all the other values of the DKProgramOp enumeration.

The DKProgram definition defines a structure called DKProgram, which corresponds to the client program. The flags field is a bitmap. It contains two possible flags, ExposeErrors and ?curve. The curve field is optional, it is only present if the ?curve flag is nonzero. The program field is not just one DKProgramStep, but any number of objects of that type.

Although a specific example as to how the programs and policies are presented is described above, various other options for presenting the programs and/or policies are possible. For example, the program may be passed directly to the operation, rather than presented as a key. In this case, constraints on the program (in the policies attached to keys) would be a separate type of constraint, rather than a constraint on a key in a particular role. These constraints may still be provided in an ACL for example. For example, the program may be preloaded into the device performing the operation, in some form other than as a key, and referenced by a name or identifier in the operation. Thus a data packet comprising the program may be pre-loaded into the HSM device, and obtained, i.e. retrieved in this case, when referenced in the command 501. The data packet may be in the form of a file loaded onto the device. Alternatively, the program may be referenced by a name or identifier during the operation and retrieved from some external source on demand. Alternatively, the program may be physically presented to the device, e.g. via an attached keyboard or keypad, or presented to the device via a removable storage medium. In such cases, the program may be identified by a filename for example. The ACL may be provided embedding in the file, or in a separate associated file for example.

Furthermore, although a specific example as to how a policy (ACL) is bound to programs and keys is described in the above example, various other means could be used. For example, a device might have fixed policies for each key type, or have some means for policies to be physically presented (e.g. if it operates in a secured physical environment). Various ways of ensuring that the relationship between each object and its policy is secure, in the sense that the relationship is either immutable or can only be changed by authorised users, may be used.

Furthermore, although in the above described example a second policy for the output data is provided in a template "key", various other means could be used. For example, a device might have fixed policies for the output key, or have some means for a policy for the output data to be physically presented. The second policy may be preloaded into the device in some form other than as a key, and referenced by a name or identifier. Alternatively, the second policy may be referenced by a name or identifier during the operation and retrieved from some external source on demand. Alternatively, the second policy may be physically presented via a removable storage medium. Alternatively, the output may have no associated policy, if no restrictions on its use are desired. In this case, no template key is provided.

Although in the above described example, the program generates a single output key, this is not limiting, and more than one output may be generated. Each output may be generated with the same policy, or a different policy can be associated with each output. In this case, multiple template keys are taken as input, and each is designated with a role that ties it to one of the outputs. For example, such a scenario may be useful for generating an asymmetric key pair. In this case, the program code would embody an operation to generate an asymmetric key pair. A different policy would then be associated with the generated public key and private keys. These policies could be provided in separate template keys for example. Furthermore, although in the above described example, the output of the program is a derived key, the program may provide outputs other than cryptographic keys. For example, the program may output signed data, where the data to be signed and the signing key are taken as input.

Furthermore, although in the above described example objects (programs, templates and keys) are identified by the cryptographic hash of the type and value of the object, other methods of identification of the objects may be used. For example, any means of identifying these objects that makes it impractical to substitute one object for another may be used. For example, object identifiers could be bound to objects in the same way as policies are, a device could have fixed identifiers for objects, non-secret objects (e.g. programs, templates and public keys) could be identified directly by their value, or objects could be identified by a cryptographic hash of their value (i.e. excluding their type).

In the above described methods, a program or program-like object is supplied with a bound policy. Although the term "program" is used in the above, it may be that a client supplies an opaque "blob" of data, which is then executed as a program on the device. In such cases, the policy is bound to data.

In the above described methods, various steps are described as being performed on the client machine 317. However, a client may access a HSM device 21 in various ways. For example, some or all of the steps described as being performed on the client machine 317 may be performed on a separate server through a web application accessed on the client machine for example.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

Further embodiments are set out in the following clauses:
1. A computer implemented method comprising:
   obtaining first data, comprising a representation of computer program code that embodies a cryptographic algorithm;
   obtaining second data;
   receiving a request for a first mechanism to be performed, the request comprising information identifying the first mechanism, and information identifying the first data as corresponding to a program and the second data as corresponding to an input;
   performing the first mechanism, wherein performing the first mechanism comprises:
      performing a first determination, the first determination comprising determining whether a first policy associated with the second data permits the second data to be used with the program represented in the first data; and
      if the first determination is successful, executing the program represented in the first data taking the second data as input.
2. The method according to clause 1, wherein the first determination further comprises determining whether the first policy permits the second data to be used in the first mechanism.
3. The method according to any preceding clause, wherein the first policy is a first access control list comprising a list of permissions relating to use of the second data.
4. The method according to any preceding clause, wherein the first determination further comprises determining whether a third policy associated with the computer program code permits the computer program code to be used with the second data.
5. The method according to clause 4, wherein the third policy is a third access control list comprising a list of permissions relating to use of the program.
6. The method according to any preceding clause, further comprising:
   obtaining third data, comprising a representation of output policy information;
   wherein the request further comprises information identifying the third data as corresponding to a second policy;
   wherein performing the first mechanism further comprises associating the second policy with output data from the program.
7. The method according to clause 6, wherein the first determination further comprises determining whether the first policy permits the second data to be used with the output policy in the third data.
8. The method according to clause 6 or 7, wherein the first determination further comprises determining whether a fourth policy associated with the output policy permits the output policy to be used with the program represented in the first data.
9. The method according to any preceding clause, wherein the second data is a cryptographic key.

10. The method according to any preceding clause, wherein the computer program code comprises one or more functions from a pre-determined set of functions.
11. The method according to any preceding clause, further comprising:
    generating a representation of computer program code that embodies the cryptographic algorithm at a first device;
    sending the first data from the first device to a second device; and
    performing the first mechanism at the second device.
12. The method according to any preceding clause, further comprising:
    obtaining fourth data;
    wherein the request further comprises information identifying the fourth data as corresponding to input data, and wherein the request further defines the role of the second data and the fourth data;
    wherein performing the first determination further comprises determining whether a fifth policy associated with the fourth data permits the fourth data to be used with the program represented in the first data.
13. The method according to clause 12, wherein the first determination further comprises determining whether the fifth policy permits the fourth data to be used with the second data and/or determining whether the first policy permits the second data to be used with the fourth data.
14. A carrier medium comprising computer readable code configured to cause a computer to perform the method of any preceding clause.
15. A device, comprising:
    an input configured to receive a request for a first mechanism to be performed, the request comprising information identifying the first mechanism, and information identifying first data as corresponding to a program and second data as corresponding to an input; and
    a processor configured to:
        obtain the first data, comprising a representation of computer program code that embodies one or more cryptographic operations, and obtain the second data;
        perform the first mechanism, wherein performing the first mechanism comprises:
            performing a first determination, the first determination comprising determining whether a first policy associated with the second data permits the second data to be used with the program represented in the first data; and
            if the first determination is successful, executing the program represented in the first data taking the second data as input.

APPENDIX 1

The below is an excerpt from an API definition specifying a language which may be used to write the computer program code in an example implementation. The below is a list of definitions which define various data types in the example.

```
-----------------------------------------------------------------
---------
Cmd LoadBlob =32
    [Load a key blob.
    Loading a key blob implies decrypting it with the required module key
    or logical token and creating a key handle that refers to the result]
    Args
                bitmap:                         flags
                    ?idkb                           [idkb is valid]
                    ?file                           [file is valid]
                    harmless: 16-
                ModuleID                        module      [module to load onto]
                ByteBlock                       blob        [key blob]
                optional: KeyID                 idkb        [key handle that protects
blob]
                optional: FileSpec              file        [file name to load file from;
if provided the blob value is ignored]
    Reply
                KeyID                           idka        [resulting key handle]
Cmd Import =11
[
    Loads a key given in plain text from the host into the module.
    If the FIPS140Level3 flag was set in @ref Cmd_SetNSOPerms,
    Import will fail with status @ref Status_StrictFIPS140 if you attempt
    to import a key that has Sign or Decrypt permissions.
    If @ref NSOPermsModeFlags_CommonCriteriaCMTSRestrictions was set in @ref
Cmd_SetNSOPerms,
    Import of a secret key will fail with @ref Status_AccessDenied.
    If you want to import both parts of an asymmetric key, you must
    import the public and private halves in separate operations. However, it is
    possible to import only the part you actually need to use.
]
Args
                ModuleID                        module
                [Module to import key
                If the ModuleID is zero, the key is loaded onto the first
                available module. You can use the GetWhichModule command to
                determine which modules contain which keys.
                ]
                KeyData                         data        [key material]
                ACL                             acl         [access control list for imported
```

```
                                          -continued
key]
            AppData                        appdata [application data for
imported key]
    Reply
            callback: newkeyids
            KeyID                          key [handle for imported key]
Cmd DeriveKey =75
[
    Takes a list of two or more keys and produces a result key.
    Particular positions in this list are known as "roles".
    The keys in the list shall be in the following order:
    1. The @ref DeriveRole_TemplateKey. It supplies the
    AppData and ACL for the resulting key.
    2. The @ref DeriveRole_BaseKey. This is the program key for the "DeriveMech
Programmed", i.e. the first mechanism.
    3. The @ref DeriveRole_WrapKey. This is the first input key for the
"DeriveMech Programed" mechanism, i.e. the first mechanism.
    Further roles (positions within the list) do not have special names
    although they can be referred to as @ref DeriveRole_Key3, @ref
    DeriveRole_Key4 and @ref DeriveRole_Key5.
    Each key must have a satisfied PermissionGroup in its ACL allowing
    it to be used for the given role.
]
    Args
            bitmap:                        flags
                WorldHashMech              [the hash mechanism for
Security World keys will be used for identifying keys]
                harmless: 16-
            enum: DeriveMech               mech    [derivekey mechanism - the
numeric constant 42 will be used here to indicated the "DeriveMech
Programmed"]
            table: KeyID                   keys    [list of keys, ordered by
role]
            variadic: mech DKParams        params [mechanism-specific parameters
- this is optional, and the "DeriveMech Programmed" described here uses no
parameters]
    Reply
            KeyID                          key     [the result key]
Act DeriveKey =5
    [An action which describes a @ref Cmd_DeriveKey operation. This must be
included in the ACL of each of the keys in order for the DeriveKey operation
requested in the command to be performed]
    Details
            bitmap:                        flags
                ?params                    [derive key params
present]
            enum: DeriveRole               role    [the role of this key in
the operation]
            enum: DeriveMech               mech    [the operation's
derivation mechanism. It is recommended to restrict this mechanism to the
intended key derivation mechanism (i.e. avoid using @ref DeriveMech_Any),
otherwise any key derivation mechanism can be used which may be a security
risk. The numeric constant 42 will be used here to indicated the "DeriveMech
Programmed"]
            table: KeyRoleID               otherkeys [roles and identities of
all the other keys involved]  params    [operation parameters as
            optional: DKMechParams
inputs to the mechanism]
KeyRoleID
    [A pair of a derive key role and key hash. This is used to make statements
along the lines of
        'a key with this hash is allowed to be present in this role'.]
            enum: DeriveRole               role    [key role]
            KeyHash                        hash    [key hash]
KeyType DKTemplate =24
    [
    A DKTemplate is a template key whose key data contains a marshaled ACL and
    application data. DKTemplate keys cannot be created with GenerateKey because
    this would produce a random ACL. You must @ref Cmd_Import the key.
    Used by @ref Cmd_DeriveKey.
    ]
    Data
            ByteBlock                      appdata
            [This specifies application data for the new key]
            ByteBlock                      nested_acl
            [
            This is the marshaled ACL for the new key. Use the function
            @ref NFastApp_MarshalACL( ) in order to produce an ACL in the correct
format.
```

```
                    ]
DeriveRole TemplateKey =0
    [
    A DKTemplate key which acts as carrier for the result key's ACL and
    AppData.
    ]
DeriveRole BaseKey =1
    [
    A key whose presence and interpretation depends on the DeriveKey
    mechanism. This is the program key for the "DeriveMech Programmed", i.e. the
first mechanism.
    ]
DeriveRole WrapKey =2
    [
    A key whose presence and interpretation depends on the DeriveKey
    mechanism.
    ]
DeriveRole Key3 =3
    [
    A key whose presence and interpretation depends on the DeriveKey
    mechanism.
    ]
DeriveRole Key4 =4
    [
    A key whose presence and interpretation depends on the DeriveKey
    mechanism.
    ]
DeriveRole Key5 =5
    [
    A key whose presence and interpretation depends on the DeriveKey
    mechanism.
    ]
/* Programmable Key Derivation ===================== */
DKProgramStep
    [One step in a key derivation program]
    export:
        enum: DKProgramOp op [operation to perform]
        variadic: op Args args [arguments to operation]
/* Style guide for DKProgramOp Args:
 *  - destination registers first (e.g. Slice)
 *  - binary operations between source arguments (e.g. Branch, BinaryOp)
 *  - three-argument form for binary operations, i.e. dest=a OP B
 *    (not dest=dest OP B) (e.g. BinaryOp)
 *  - branch destinations last (e.g. Branch)
 *
 * There are some rules about M_Word field names :
 *  - br<name> for byteblock registers
 *  - ir<name> for integer registers
 *  - c<name> for constants
 *  - s<name> for step numbers (i.e. branch targets)
 *
 * This matters! The assembler will depend on it to
 * do syntax-checking correctly.
 */
DKProgramOp NoOp =0
    [Do nothing]
    Args
DKProgramOp Concatenate =1
    [Concatenate two byteblock registers
        Stores the concatenation of BBa and BBb in BBdest.]
    Args
        Word brdest [destination byteblock register]
        Word bra [first source byteblock register]
        Word brb [ second source byteblock register]
DKProgramOp Slice =2
    [Extract a slice of a byteblock register
        Takes the @p len bytes at offset @p start within BBsrc and stores
        them in BBdest.
        If the @p Sloppy flag is clear then the required range must fit inside the
source register.
        If the @p Sloppy flag is set then the required range may extend
        beyond the end of the source register. The destination will be
        truncated accordingly.]
    Args
        bitmap: flags
            Sloppy [if set, range may exceed source register]
        Word brdest [destination byteblock register]
        Word brsrc [source byteblock register]
        Word cstart [start index within source from 0]
```

-continued

```
        Word clen [number of bytes to extract from source]
DKProgramOp Hash =3
    [Hash the contents of a byteblock register
        Stores the hash of BBsrc in BBdest.]
    Args
        Word brdest [destination byteblock register]
        Word brsrc [source byteblock register]
        Mech mech [hash mechanism]
DKProgramOp LoadBytes =4
    [Load a byteblock register with a constant
    Stores @p value in BBdest.]
    Args
        Word brdest [destination byteblock register]
        ByteBlock value [source value]
DKProgramOp Sign =5
    [Sign a byteblock register with a key
    Stores the signature of BBmsg under BBkey in BBdest.
    Currently only symmetric keys are supported.]
    Args
        Word brdest [byteblock register to store signature]
        Word brmsg [byteblock register containing message to sign]
        Word brkey [byteblock register containing key]
        KeyType keytype [key type]
        Mech mech [signature mechanism]
DKProgramOp Unpack =6
    [Unpack an integer register from a byteblock register
    The byteblock register must be at least start+len bytes long.]
    Args
        bitmap: flags
            LittleEndian [integer is in little-endian serialization]
        Word irdest [integer destination register]
        Word brsrc [byteblock source register]
        Word cstart [start position of integer]
        Word clen [length of integer in bytes]
DKProgramOp Pack =7
    [Pack an integer register into a byteblock register
        If the byteblock register is not currently long enough it will be
        extended. Any missing bytes are set to 0.]
    Args
        bitmap: flags
            LittleEndian [integer is in little-endian serialization]
        Word brdest [byteblock source register]
        Word cstart [start position of integer]
        Word clen [length of integer in bytes]
        Word irsrc [integer source register]
DKProgramOp LoadInt = 8
    [Load an integer register]
    Args
        Word irdest [integer destination register]
        Bignum value [integer value]
DKProgramOp GetLength =9
    [Get the length of a byteblock register]
    Args
        Word irdest [integer register to store length]
        Word brsrc [byteblock register to measure]
DKProgramOp Branch =10
    [Conditional branch
    To construct an unconditional branch, compare a register for
    equality with itself.
    Branching beyond the end of the program terminates it.]
    Args
        Word ira [first integer register to compare]
        TestVal test [test to perform]
        Word irb [second integer register to compare]
        Word sdest [target step if test is true]
DKProgramOp BinaryOp =11
    [Perform a binary operation on integers
    Note that only a subset of expressible operations work.]
    Args
        Word irdest [destination for result]
        Word ira [first integer to operate on]
        StackOp op [operation]
        Word irb [second integer to operate on]
DKProgramOp RegSlice =12
    [Extract a slice of a byteblock register
        Equivalent to @ref DKProgramOp_Slice except that the @p start and
        @p len are integer register numbers.
        The required range must fit inside the source register; there
        is no implicit truncation.]
```

```
    Args
        Word brdest [destination byteblock register]
        Word brsrc [source byteblock register]
        Word irstart [integer register for start index within source from 0]
        Word irlen [integer register for number of bytes to extract from source]
DKProgramOp Error =13
    [Return an error]
    Args
        Status status [error code to return]
DKProgramOp Encrypt =14
    [Encrypt a byteblock register with a key
    Encrypts @p brmsg under @p brkey and stores the result in in @ref brdest.
    Normally the caller must supply the IV in @p briv (for mechanisms
    that require one). If the @p GenerateIV flag is set the @p briv
    will be set to a suitable random value and that will be used as the
    IV.
    Currently only symmetric keys are supported, and some mechanisms are
    missing (e.g. @ref Mech_RijndaelmGCM).]
    Args
        bitmap: flags
        GenerateIV [if set, @p briv will be set to a random string]
        Word brdest [byteblock register to store ciphertext]
        Word briv [byteblock register containing IV]
        Word brmsg [byteblock register containing message to encrypt]
        Word brkey [byteblock register containing key]
        KeyType keytype [key type]
        Mech mech [encryption mechanism]
DKProgramOp Decrypt =15
    [Decrypt a byteblock register with a key
    Decryps @p brmsg using @p brkey and stores the result in in @ref brdest.
    Currently only symmetric keys are supported, and some mechanisms are
    missing (e.g. @ref Mech_RijndaelmGCM).]
    Args
        Word brdest [byteblock register to store plaintext]
        Word briv [byteblock register containing IV]
        Word brmsg [byteblock register containing message to decrypt]
        Word brkey [byteblock register containing key]
        KeyType keytype [key type]
        Mech mech [decryption mechanism]
DKProgram
  [A key derivation program
    This is a sequence of program steps, executed in order. Each
    operation acts on one or more byteblock registers (denoted BBn),
    integer registers (In) or EC point registers (ECn). All of these
    collections of registers independently numbered from 0. The number
    of registers required of each type must be specified up front.
    The number of input keys must also be specified up front. Key values
    are assigned sequentially to appropriately-typed registers starting
    from 0.
    - Byteblock keys are always assigned to byteblock registers
    - @ref KeyType_DES, @ref KeyType_DES2 and @ref KeyType_DES3 keys are always
assigned to byteblock registers
    - The rest are not yet implemented.
    There must be enough registers for this to succeed.
    Note that the number of keys specified is one less than the number
    supplied to @ref Cmd_DeriveKey, since the latter includes the
    template key.
    On successful completion a result key of the specified type is taken
    from appropriately-typed registers(s) starting from 0.
    - Byteblock keys take byteblock register 0
    - @ref KeyType_DES, @ref KeyType_DES2 and @ref KeyType_DES3 are taken from
byteblock register 0 and have parity set (by adjusting the least significant
bit if necessary)
    - @ref KeyType_DHPrivate keys take dlg.p, dlg.g,x from integer registers
0,1,2
    - @ref KeyType_DHPublic keys take dlg.p,dlg.g, gx from integer registers
0,1,2
    - @ref KeyType_ECPrivate keys take d from integer register 0 and the curve
from the @p curve parameter
    Keys are validity-checked after construction, in the same way as for
    any other operation that introduces a key into the module.
    Normally all errors from individual program steps are squashed to a
    single value. (This doesn't apply to setup operations. ) For
    debugging purposes, this behavior can be suppressed with the @c
    ExposeErrors flag.
    @see @ref KeyType_DKProgram, @ref DeriveMech_Programmed.]
    export:
      bitmap: flags
        ExposeErrors [distinguish error cases for debugging purposes]
```

```
    ?curve [set if @p curve is provided]
    Word nbbr [byteblock registers required for this program]
    Word nir [integer registers required for this program]
    Word necr [EC point registers required for this program]
    Word nkeys [keys required up front]
    KeyType keytype [output key type]
    optional: EllipticCurve curve [output elliptic curve type]
    table: DKProgramStep program [this is an array of program steps]
KeyType DKProgram =58
    [Container key type for programmable key derivation
    See the description of @ref M_DKProgram for full documentation.]
    Data
        DKProgram program [program to execute]
DeriveMech Programmed =42
    [Programmable key derivation
    The @ref DeriveRole_BaseKey must have type @ref KeyType_DKProgram
    and contain a valid key derivation program. The remaining keys are
    supplied in registers to the program and output of this mechanism is
    he result of the program. See @ref M_DKProgram for additional
    information.]
    DKParams
```

The invention claimed is:

1. A computer implemented method comprising:
obtaining first data, comprising a representation of computer program code that embodies a cryptographic algorithm;
obtaining second data;
receiving a request for a first mechanism to be performed, the request comprising information identifying the first mechanism, and information identifying the first data as corresponding to a program and the second data as corresponding to an input;
performing the first mechanism, wherein performing the first mechanism comprises:
  performing a first determination, the first determination comprising:
    determining whether a first policy associated with the second data permits the second data to be used with the program represented in the first data, and
    determining whether a further policy associated with the computer program code permits the computer program code to be used with the second data; and
  if the first determination is successful, executing the program represented in the first data taking the second data as input;
wherein the further policy is a third policy, and the computer implemented method further comprises obtaining third data, comprising a representation of output policy information;
wherein the request further comprises information identifying the third data as corresponding to a second policy; and
wherein performing the first mechanism further comprises associating the second policy with output data from the program.

2. The computer implemented method according to claim 1, wherein the first determination further comprises determining whether the first policy permits the second data to be used in the first mechanism.

3. The computer implemented method according to claim 1, wherein the first policy is a first access control list comprising a list of permissions relating to use of the second data.

4. The computer implemented method according to claim 1, wherein the third policy is a third access control list comprising a list of permissions relating to use of the program.

5. The computer implemented method according to claim 1, wherein the first determination further comprises determining whether the first policy permits the second data to be used with the output policy in the third data.

6. The computer implemented method according to claim 1, wherein the first determination further comprises determining whether a fourth policy associated with the output policy permits the output policy to be used with the program represented in the first data.

7. The computer implemented method according to claim 1, wherein the second data is a cryptographic key.

8. The computer implemented method according to claim 1, wherein the computer program code comprises one or more functions from a pre-determined set of functions.

9. The computer implemented method according to claim 1, further comprising:
generating the representation of computer program code that embodies the cryptographic algorithm at a first device;
sending the first data from the first device to a second device; and
performing the first mechanism at the second device.

10. The computer implemented method according to claim 1, further comprising:
obtaining fourth data;
wherein the request further comprises information identifying the fourth data as corresponding to input data, and wherein the request further defines a role of the second data and the fourth data;
wherein performing the first determination further comprises determining whether a fifth policy associated with the fourth data permits the fourth data to be used with the program represented in the first data.

11. The computer implemented method according to claim 10, wherein the first determination further comprises determining whether the fifth policy permits the fourth data to be used with the second data and/or determining whether the first policy permits the second data to be used with the fourth data.

12. A device, comprising:
an interface configured to receive a request for a first mechanism to be performed, the request comprising information identifying the first mechanism, and information identifying first data as corresponding to a program and second data as corresponding to an input; and a processor configured to:
obtain the first data, comprising a representation of computer program code that embodies one or more cryptographic operations, and obtain the second data;
perform the first mechanism, wherein performing the first mechanism comprises:
performing a first determination, the first determination comprising:
determining whether a first policy associated with the second data permits the second data to be used with the program represented in the first data, and
determining whether a further policy associated with the computer program code permits the computer program code to be used with the second data; and
if the first determination is successful, executing the program represented in the first data taking the second data as input;
wherein the further policy is a third policy, and the processor is further configured to obtain third data, comprising a representation of output policy information;
wherein the request further comprises information identifying the third data as corresponding to a second policy; and
wherein performing the first mechanism further comprises associating the second policy with output data from the program.

13. A non-transitory computer readable storage medium comprising computer readable code configured to cause a computer to perform the following:
obtaining first data, comprising a representation of computer program code that embodies a cryptographic algorithm;
obtaining second data;
receiving a request for a first mechanism to be performed, the request comprising information identifying the first mechanism, and information identifying the first data as corresponding to a program and the second data as corresponding to an input;
performing the first mechanism, wherein performing the first mechanism comprises:
performing a first determination, the first determination comprising:
determining whether a first policy associated with the second data permits the second data to be used with the program represented in the first data, and
determining whether a further policy associated with the computer program code permits the computer program code to be used with the second data; and
if the first determination is successful, executing the program represented in the first data taking the second data as input;
wherein the further policy is a third policy, and the non-transitory computer readable storage medium further comprises computer readable code configured to cause a computer to obtain third data, comprising a representation of output policy information;
wherein the request further comprises information identifying the third data as corresponding to a second policy; and
wherein performing the first mechanism further comprises associating the second policy with output data from the program.

14. A computer implemented method comprising:
obtaining first data, comprising a representation of computer program code that embodies a cryptographic algorithm;
obtaining second data;
receiving a request for a first mechanism to be performed, the request comprising information identifying the first mechanism, and information identifying the first data as corresponding to a program and the second data as corresponding to an input;
performing the first mechanism, wherein performing the first mechanism comprises:
performing a first determination, the first determination comprising:
determining whether a first policy associated with the second data permits the second data to be used with the program represented in the first data, and
determining whether a further policy associated with the computer program code permits the computer program code to be used with the second data; and
if the first determination is successful, executing the program represented in the first data taking the second data as input;
wherein the computer implemented method further comprises obtaining fourth data;
wherein the request further comprises information identifying the fourth data as corresponding to input data, and wherein the request further defines the role of the second data and the fourth data; and
wherein performing the first determination further comprises determining whether a fifth policy associated with the fourth data permits the fourth data to be used with the program represented in the first data.

15. The computer implemented method according to claim 14, wherein the first determination further comprises determining whether the fifth policy permits the fourth data to be used with the second data and/or determining whether the first policy permits the second data to be used with the fourth data.

16. The computer implemented method according to claim 14, wherein the first determination further comprises determining whether the first policy permits the second data to be used in the first mechanism.

17. The computer implemented method according to claim 14, wherein the first policy is a first access control list comprising a list of permissions relating to use of the second data.

18. The computer implemented method according to claim 14, wherein the further policy is a third policy, and the third policy is a third access control list comprising a list of permissions relating to use of the program.

19. A device, comprising:
an interface configured to receive a request for a first mechanism to be performed, the request comprising information identifying the first mechanism, and information identifying first data as corresponding to a program and second data as corresponding to an input; and
a processor configured to:
obtain the first data, comprising a representation of computer program code that embodies one or more cryptographic operations, and obtain the second data;
perform the first mechanism, wherein performing the first mechanism comprises:
performing a first determination, the first determination comprising:

determining whether a first policy associated with the second data permits the second data to be used with the program represented in the first data, and determining whether a further policy associated with the computer program code permits the computer program code to be used with the second data; and if the first determination is successful, executing the program represented in the first data taking the second data as input;

wherein the processor is further configured to obtain fourth data;

wherein the request further comprises information identifying the fourth data as corresponding to input data, and wherein the request further defines the role of the second data and the fourth data; and wherein performing the first determination further comprises determining whether a fifth policy associated with the fourth data permits the fourth data to be used with the program represented in the first data.

20. A non-transitory computer readable storage medium comprising computer readable code configured to cause a computer to perform the following:

obtaining first data, comprising a representation of computer program code that embodies a cryptographic algorithm;

obtaining second data;

receiving a request for a first mechanism to be performed, the request comprising information identifying the first mechanism, and information identifying the first data as corresponding to a program and the second data as corresponding to an input;

performing the first mechanism, wherein performing the first mechanism comprises:

performing a first determination, the first determination comprising:

determining whether a first policy associated with the second data permits the second data to be used with the program represented in the first data, and determining whether a further policy associated with the computer program code permits the computer program code to be used with the second data; and if the first determination is successful, executing the program represented in the first data taking the second data as input;

wherein the non-transitory computer readable storage medium further comprises computer readable code configured to cause a computer to obtain fourth data;

wherein the request further comprises information identifying the fourth data as corresponding to input data, and wherein the request further defines the role of the second data and the fourth data; and wherein performing the first determination further comprises determining whether a fifth policy associated with the fourth data permits the fourth data to be used with the program represented in the first data.

* * * * *